US009696922B2

(12) United States Patent
Okada et al.

(10) Patent No.: US 9,696,922 B2
(45) Date of Patent: Jul. 4, 2017

(54) STORAGE SYSTEM

(71) Applicant: Hitachi, Ltd., Tokyo (JP)

(72) Inventors: Naoya Okada, Tokyo (JP); Yusuke Nonaka, Tokyo (JP); Akihiko Araki, Tokyo (JP); Shintaro Kudo, Tokyo (JP); Makio Mizuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 14/762,039

(22) PCT Filed: Dec. 24, 2013

(86) PCT No.: PCT/JP2013/084502
§ 371 (c)(1),
(2) Date: Jul. 20, 2015

(87) PCT Pub. No.: WO2015/097751
PCT Pub. Date: Jul. 2, 2015

(65) Prior Publication Data
US 2015/0317093 A1 Nov. 5, 2015

(51) Int. Cl.
*G06F 12/08* (2016.01)
*G06F 3/06* (2006.01)
(Continued)

(52) U.S. Cl.
CPC .......... *G06F 3/0619* (2013.01); *G06F 3/0647* (2013.01); *G06F 3/0659* (2013.01);
(Continued)

(58) Field of Classification Search
CPC .. G06F 2212/222; G06F 12/08; G06F 3/0619; G06F 12/0638; G06F 12/0893;
(Continued)

(56) References Cited

U.S. PATENT DOCUMENTS 5,701,516 A * 12/1997 Cheng ................. G06F 12/0804
710/22
7,613,877 B2 11/2009 Shimozono et al.
(Continued)

FOREIGN PATENT DOCUMENTS

JP 2008-108026 A 5/2008
JP 2009-75759 A 4/2009

OTHER PUBLICATIONS

International Search Report of PCT/JP2013/084502.

*Primary Examiner* — Hashem Farrokh
(74) *Attorney, Agent, or Firm* — Mattingly & Malur, PC

(57) ABSTRACT

A storage controller has a processor, a volatile first cache memory that is coupled to the processor and that temporarily stores data, a nonvolatile second cache memory that is coupled to a microprocessor and that temporarily stores data, and a battery that is configured to supply electrical power to at least the processor and the first cache memory when a power stoppage has occurred. The second cache memory includes a dirty data area for storing dirty data, which is data that is not stored in the storage device, and a remaining area other than the dirty data area. When a power stoppage has occurred, the processor stores as target data in the remaining area of the second cache memory either all or a part of the data stored in the first cache memory.

12 Claims, 29 Drawing Sheets

(51) Int. Cl.
*G06F 12/0875* (2016.01)
*G06F 12/06* (2006.01)
*G06F 12/0868* (2016.01)
*G06F 12/0893* (2016.01)

(52) U.S. Cl.
CPC .......... *G06F 3/0688* (2013.01); *G06F 3/0689* (2013.01); *G06F 12/0638* (2013.01); *G06F 12/08* (2013.01); *G06F 12/0868* (2013.01); *G06F 12/0875* (2013.01); *G06F 12/0893* (2013.01); *G06F 2212/222* (2013.01); *G06F 2212/2228* (2013.01)

(58) Field of Classification Search
CPC ........... G06F 2212/2228; G06F 3/0659; G06F 12/0875; G06F 3/0647; G06F 3/0688; G06F 3/0689
See application file for complete search history.

(56) References Cited

U.S. PATENT DOCUMENTS

| | | | |
|---|---|---|---|
| 2002/0194440 A1* | 12/2002 | Ghosh | G06F 11/1441 711/156 |
| 2008/0104344 A1* | 5/2008 | Shimozono | G06F 11/1441 711/162 |
| 2009/0077312 A1* | 3/2009 | Miura | G06F 11/1441 711/113 |
| 2014/0189204 A1 | 7/2014 | Sugimoto et al. | |

* cited by examiner

Fig.5

Backup data table 60

| Slot management pointer | Slot ID | Segment ID | Data size | Data head address |
|---|---|---|---|---|
| 0x10000040 | 2 | 2 | 0xffff | 0x10a0110aa |
| 0x10000000 | 1 | 4 | 0x1000 | 0x10a00000 |
| ... | ... | ... | ... | ... |
| 0x10020000 | 14 | 6 | 0x80000 | 0x20a0110aa |

Save-destination data table 70

| Slot management pointer (71) | Slot ID (72) | Segment ID (73) | Data size (74) | Data head address (75) |
|---|---|---|---|---|
| 0x10000040 | 3 | 1 | 0xffff | 0x80a0110aa |
| 0x10000000 | 2 | 3 | 0x1000 | 0x80a00000 |
| ... | ... | ... | ... | ... |
| 0x10020000 | 16 | 8 | 0x80000 | 0x90a0110aa |

Fig.22

Destage data table 80

| Slot management pointer | Slot ID | Segment ID | Dirty data size | Dirty data head address |
|---|---|---|---|---|
| 0x124a5440 | 2 | 2 | 0x400 | 0xb0a0110aa |
| 0x3fe4a9000 | 1341 | 2 | 0x123 | 0xb0a00000 |
| ... | ... | ... | ... | ... |
| 0x48663adc | 2 | 44 | 0xfff | 0xb0a0110bb |

81  82  83  84  85

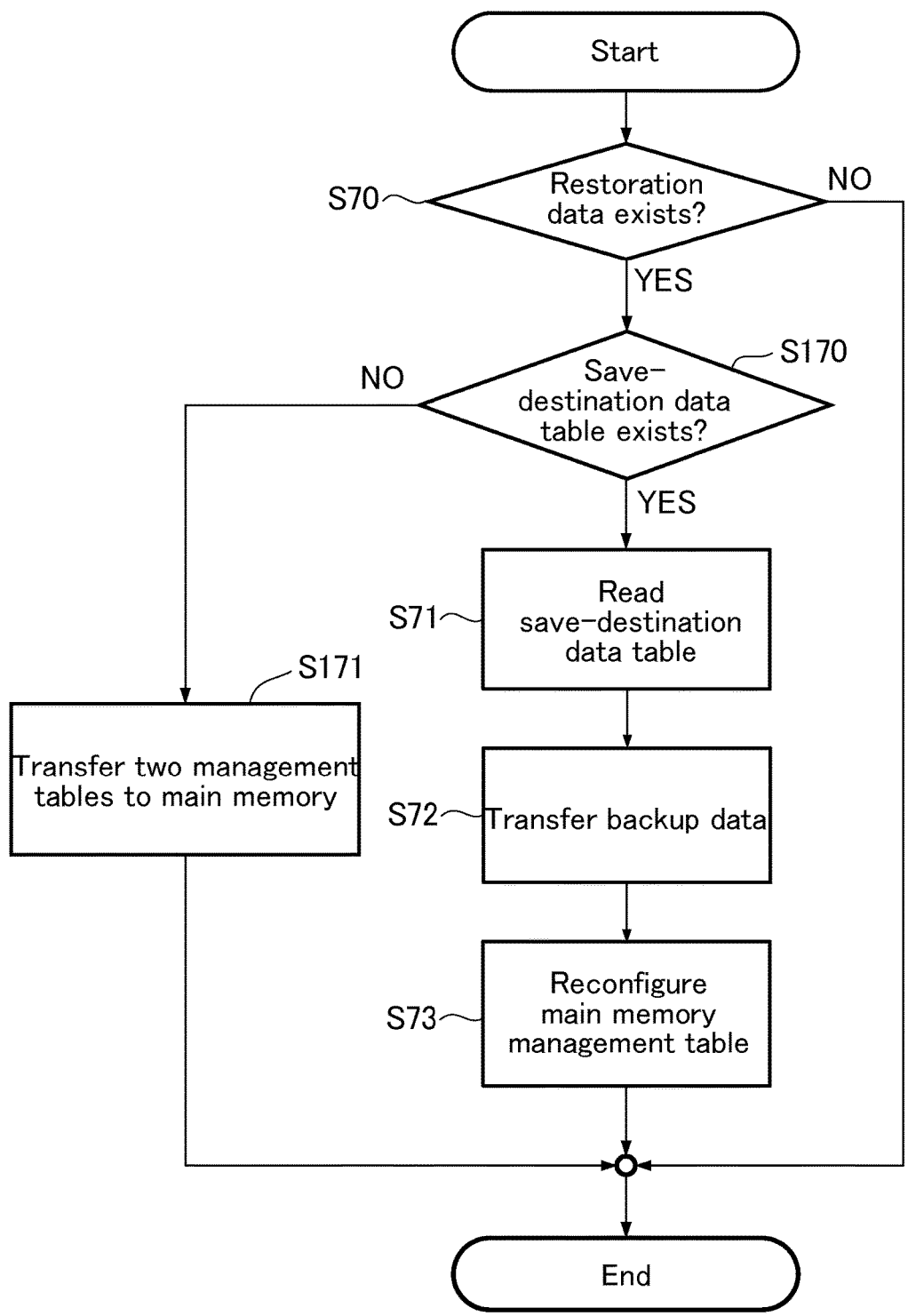

STORAGE SYSTEM

TECHNICAL FIELD

The present invention relates in general to cache control for a storage system.

BACKGROUND ART

In order to prevent the loss of data on a main storage device when there is a power shutdown, a nonvolatile memory for saving data on a main memory may be installed in a storage controller. Patent Literature 1 discloses a technique for selecting only the main memory data that should be saved and saving the data to the nonvolatile memory. For example, it is supposed that the temporary storage destination for data pursuant to an access command from a higher-level apparatus is a volatile cache memory. When the supply of power from a primary power source to the volatile cache memory temporarily stops, the data being stored in the volatile cache memory is copied to a nonvolatile memory using power supplied from a battery.

CITATION LIST

Patent Literature

[PTL 1]
Japanese Patent Laid-open Publication No. 2008-108026

SUMMARY OF INVENTION

Technical Problem

However, the technique disclosed in Patent Literature 1 does not take into account the capacities of the nonvolatile memory and the volatile cache memory, and as such, in the case of a large-capacity volatile cache memory, it may not be possible to backup all of the volatile cache memory data. Also, the battery capacity and the backup medium capacity required at the time of a power shutdown increases in accordance with an increase in the capacity of the main storage cache memory.

Accordingly, the problem for a storage system is to reduce battery capacity and cut costs by shortening data transfer time when there is a power stoppage.

Solution to Problem

To solve for the above problems, a storage system includes a storage device, and a storage controller for receiving data from a host computer and storing the received data in the storage device. The storage controller includes a processor, a volatile first cache memory that is coupled to the processor and is for temporarily storing data, a nonvolatile second cache memory that is coupled to a microprocessor and is for temporarily storing data, and a battery that is configured to supply electrical power to at least the processor and the first cache memory when a power stoppage occurs. The second cache memory includes a dirty data area for storing dirty data, which is data that is not stored in the storage device, and a remaining area other than the dirty data area. When a power stoppage occurs, the processor is configured to store in the remaining area of the second cache memory as target data either all or a portion of the data stored in the first cache memory.

Advantageous Effects of the Invention

According to the present invention, it is possible to reduce battery capacity and cut costs by shortening the data transfer time when a power stoppage occurs.

BRIEF DESCRIPTION OF DRAWINGS

FIG. 5 shows the configuration of a dirty data table.
FIG. 7 shows the configuration of a save-destination data table.
FIG. 22 shows the configuration of a destage data table.
FIG. 29 shows a flowchart of a backup data restoration process according to the third embodiment.

DESCRIPTION OF EMBODIMENTS

Figure 1:
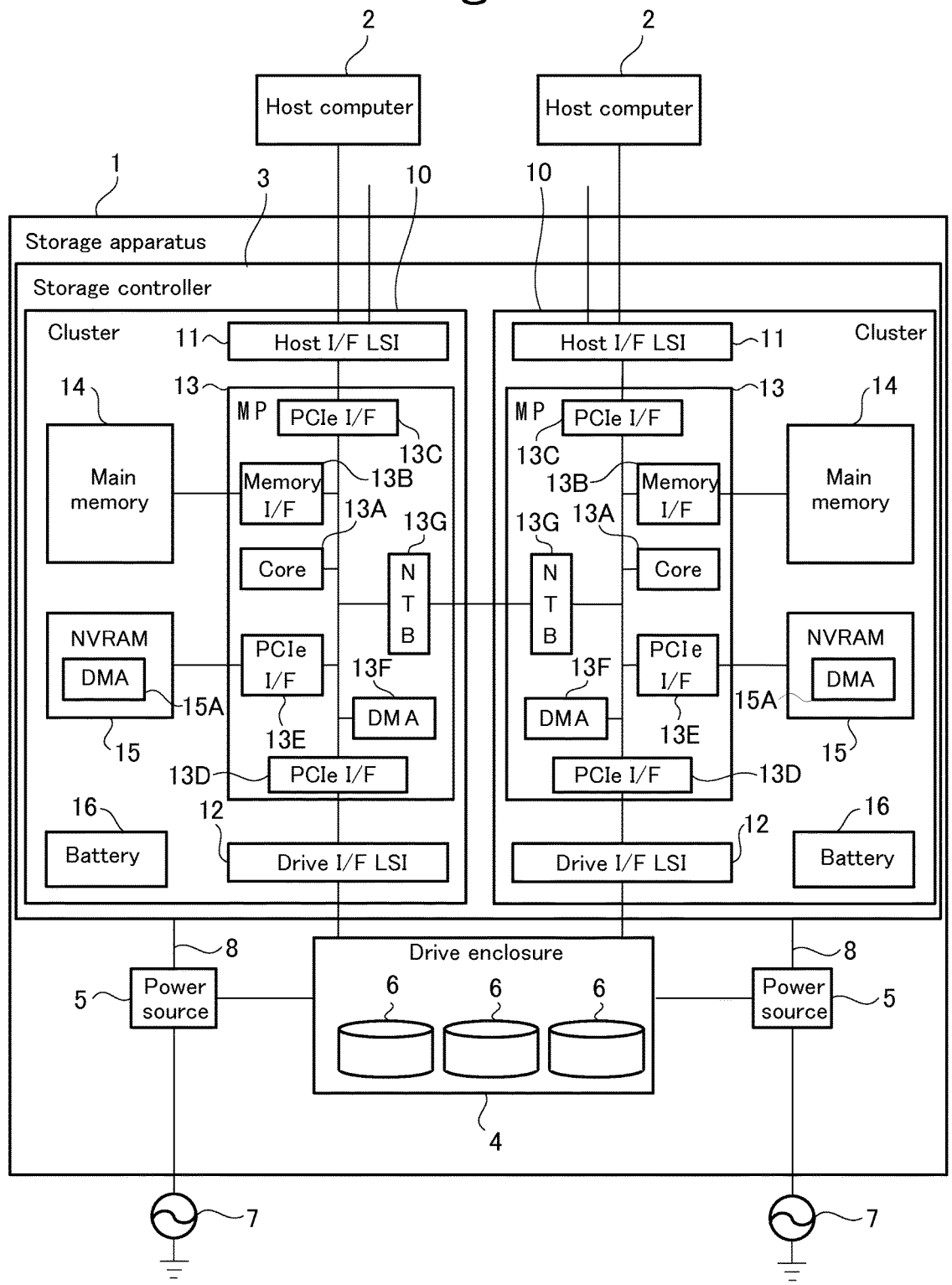
FIG. 1 shows a storage system according to a first embodiment.

The embodiment of the present invention will be explained below while referring to the drawings. FIG. 1 shows the configuration of a storage system according to a first embodiment of the present invention.

The storage system includes a host computer 2 and a storage apparatus 1 coupled to the host computer 2. The storage apparatus 1 is coupled to the host computer 2 for processing data and performing operations. The storage apparatus 1 is coupled to the host computer 2 via a fibre channel (FC) and a data transfer path using iSCSI or the like. There may be one or a plurality of host computers 2.

The storage apparatus 1 includes a storage controller 3, a drive enclosure 4, and a power source 5. The drive enclosure 5 houses a plurality of storage drives 6 (three drives in this embodiment). The power source 5 supplies electrical power to the storage controller 3 and the drive enclosure 4. The storage apparatus 1 is coupled to a commercial power source 7.

The respective number of storage controllers 3, drive enclosures 4, and power sources 5 included in the storage apparatus 1 will depend on the design. The type of storage drive is irrelevant. For example, the storage drives may be hard disk drives (HDDs), or may be solid state drives (SSDs) mounted with flash memory or another such nonvolatile memory.

The storage drive 6, for example, is a nonvolatile storage medium, and stores user data transferred from the host computer 2. For example, a plurality of storage drives 6 may be configured as redundant arrays of inexpensive disks (RAID) to achieve data redundancy. In accordance with this, even when a failure occurs in the storage drive 6 and data is lost, it is possible to restore the lost data on the basis of the data and parity of the storage drives 6. A storage drive 6 is one example of a storage device.

The storage controller 3 includes a plurality of clusters 10, and in this embodiment, includes two clusters 10. The storage controller 3 places a high value on availability, and is provided with two clusters 2 in order to provide continuous service. Since the two clusters 10 have the same configuration, the same reference signs will be appended, and only one of the clusters 10 will be explained.

The cluster 10 includes a host interface (I/F) LSI 11, a drive I/F LSI 12, a microprocessor (simply MP hereinafter) 13, a main memory 14, an NVRAM 15, and a battery 16.

The host I/F LSI 11 is a device used in communications with the host computer 2, and includes functions for converting FC, Fibre Channel Over Ethernet (registered trademark) (FCoE), iSCSI and other such communication protocols to the PCIe protocol used inside the storage apparatus 1. Data is transferred from the host computer 2 to the storage apparatus 1 in 512-byte units, but the host I/F LSI 11 is configured so as to add an 8-byte CRC to the data.

The drive I/F LSI 12 is a device for coupling the drive enclosure 4 that houses a plurality of drives 6 to the storage controller 3. For example, the drive I/F LSI 12 includes functions for converting a communication protocol that is used for communications between the storage drive 6 and the storage controller 3, such as FC, serial attached SCSI (SAS), serial advanced technology attachment (SATA), or non-volatile memory express (NVMe) to a protocol used inside the storage controller 3, for example, the PCIe protocol.

The MP 13 executes internal processing in the cluster 10. The MP 13 includes a core 13A for executing an operation and a data read/write, and controlling the storage controller, a memory I/F 13B for performing a data transfer with the main memory 14, a PCIe interface 13C for coupling the host I/F LSI 11 to the MP 13, a PCIe I/F 13D for coupling the drive I/F LSI 12 to the MP 13, a PCIe I/F 13E for coupling the NVRAM 15 to the MP 13, a DMA 13F for performing a data transfer between the main memory 14 and the other cluster 2 (also called the remote cluster), and a non-transparent bridge (NTB) 13G that constitutes a communication I/F with the remote cluster 2. The internal components of the MP 13 are coupled to one another via an internal network. The memory I/F 13B, for example, is a DDR interface. The MP 13 core 13A creates parity for each below-described segment 32 when copying user data from the main memory 14 to the storage drive 6, and stores (destages) the parity in the storage drive 6.

The main memory 14 is coupled to the MP 13, and is a volatile storage device including a semiconductor memory such as double data rate (DDR) synchronous DRAM. The capacity of the main memory 14, for example, is from 100 to 500 GB. The main memory 14 is coupled to the MP 13 via the memory I/F 13B, which is a DDR interface. The main memory 14 temporarily stores data that is read/written from/to the host computer 2 (the caching of user data), and also stores data handled by the MP 13 and a program for controlling the storage controller 10. The data stored in the main memory 14 will be described in detail below. The main memory 14 is one example of a first cache memory.

The NVRAM 15 is typically a nonvolatile storage device that is coupled to the microprocessor 13 via the PCIe I/F 13E, and includes semiconductor memory, such as a NAND-type flash memory, a phase change RAM (PCM), or a resistance RAM (ReRAM). The capacity of the NVRAM 15, for example, is between 500 GB and 1 TB. The NVRAM 15 is mounted with a direct memory access (DMA) 15A for transferring data stored in the main memory 14 to the NVRAM 15. The NVRAM 15 temporarily stores data that is read/written from/to the host computer 2. Generally speaking, the NVRAM 15 has a higher data recording density per area than a DRAM, but has low data-read and data-write rates, and data can only be rewritten a small number of times. The data stored in the NVRAM 15 will be explained in detail below. The NVRAM 15 is one example of a second cache memory.

The battery 16, for example, is a rechargeable secondary battery, and supplies electrical power in place of a power source when electrical power can no longer be supplied to the storage controller 3 due to a malfunction in the power source 5. The type of battery including the battery 16 is irrelevant. For example, the battery 16 can be a lead-acid storage battery, a lithium ion battery, and so forth. The battery 16 maintains an electric charge for operating at least the MP 13, the main memory 14, and the NVRAM 15 in the cluster 10 for a fixed period of time. The battery 16 is configured so as to start supplying electrical power to the cluster 10 when there is a voltage drop (also called a power stoppage) on the circuit supplying electrical power to the cluster 10.

Figure 2:
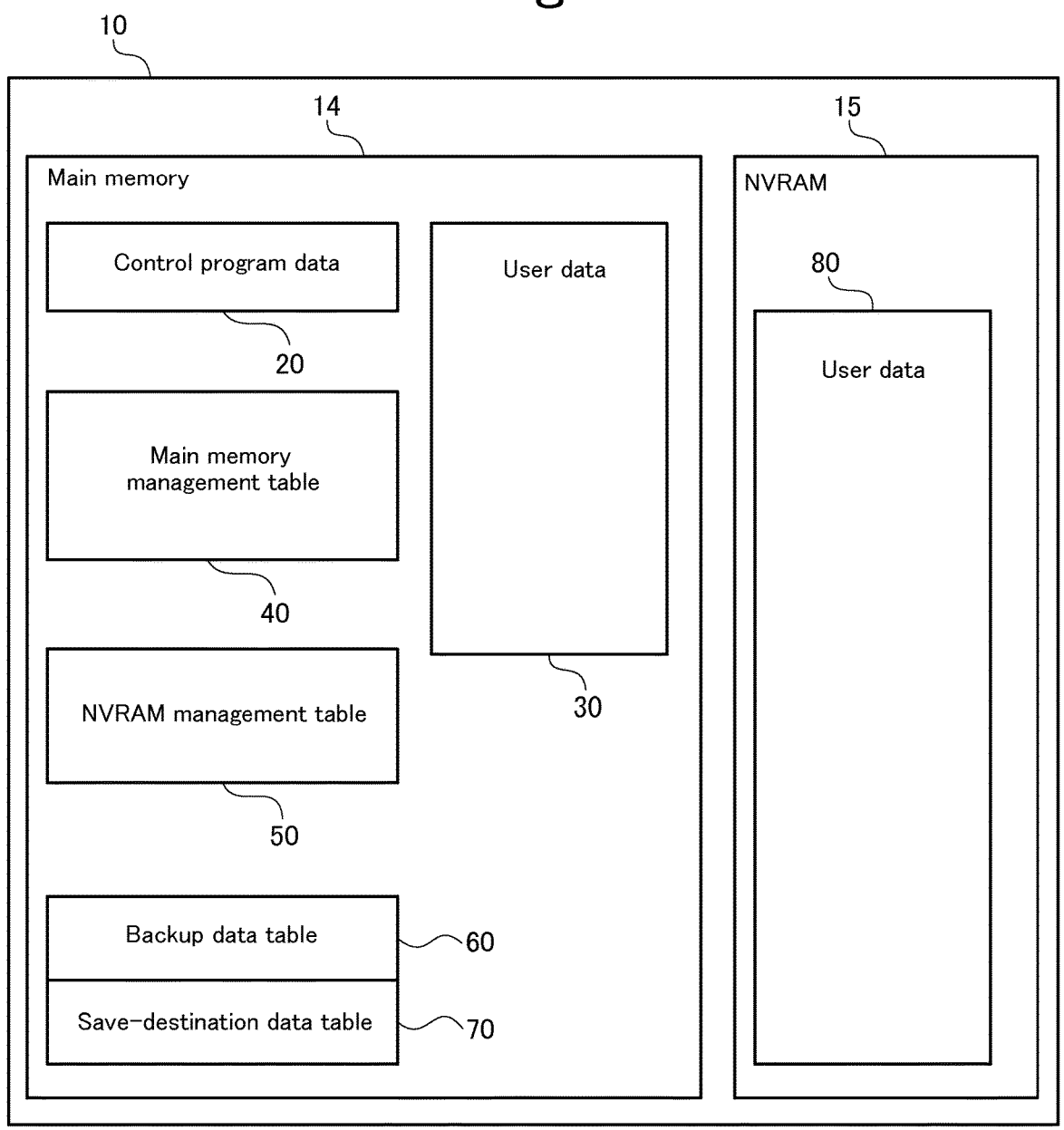
FIG. 2 shows the configuration of data stored in a main memory and an NVRAM.

FIG. 2 shows an example of the configuration of data stored in the main memory 14 and the NVRAM 15.

The main memory 14 stores control program data 20, which is a program for controlling the storage controller 3, user data 30 read/written from/to the host computer 2, a main memory management table 40 for storing information for managing the user data 30, an NVRAM management table 50 for storing information for managing user data stored in the NVRAM 15, a backup data table 60 for managing data constituting a backup target on the main memory 14, and a save-destination data table 70 for managing areas on the NVRAM 15 in which user data 30 is able to be saved. The NVRAM 15 stores user data 80.

The configurations of the user data 30 and 80, the management tables 40 and 50, the backup data table 60, and the save-destination data table 70 will be described in detail below. Only the user data 80 is stored in the NVRAM 15. The NVRAM 15 is basically used as a cache memory, and has write performance that is lower than the main memory 14, which is a DRAM, and as such, the frequently accessed management tables 40 and 50, and the control program data 20 are not stored in the NVRAM 15.

Of the user data transferred from the host computer 2 to the storage apparatus 1, the user data that is stored in the cache memory and has already been copied to the storage drive 6 is called clean data. That is, the user data destaged to the storage drive 6 is clean data. Alternatively, of the user data transferred from the host computer 2 to the storage apparatus 1, the user data that is stored in the cache memory but has yet to be copied to the storage drive 6 is called dirty data. That is, user data that has not yet been destaged to the storage drive 6 is dirty data.

Figure 3:
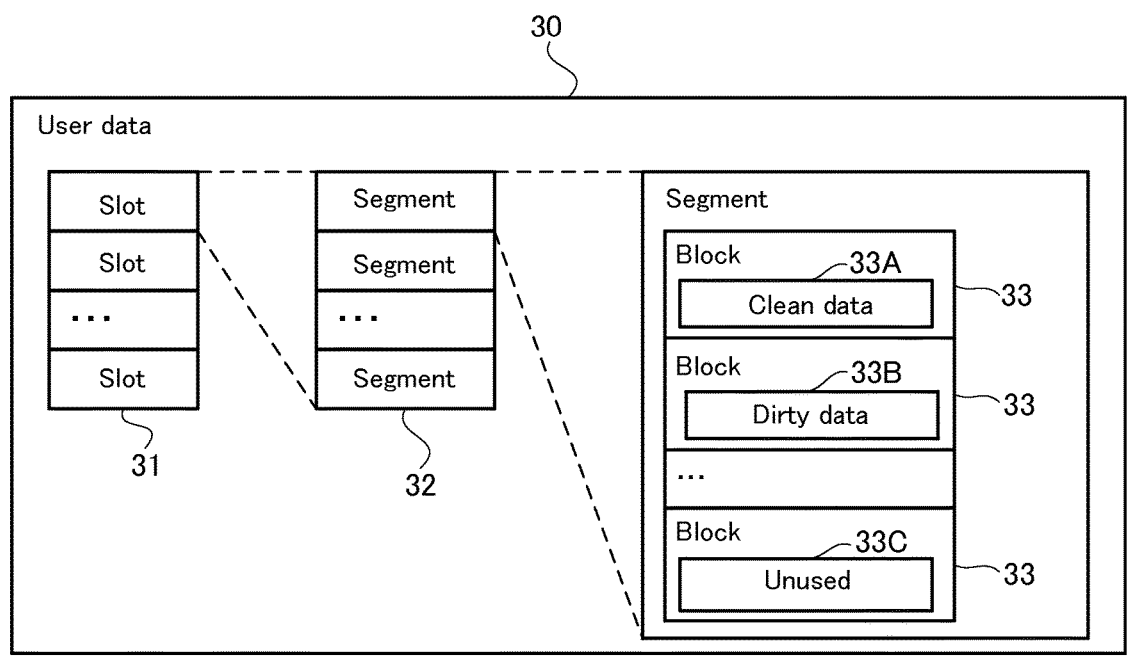
FIG. 3 shows a user data configuration.

FIG. 3 shows the configuration of the user data 30.

The user data 30 represents an aggregate of data transferred from the host computer 2. As shown in FIG. 3, one slot 31 includes a plurality of segments 32, and each segment 32 respectively includes a plurality of blocks 33. Although not shown in the drawing, the user data 80 stored in the NVRAM 15 has the same configuration as the user data 30.

One slot 31, for example, is 256 KB, and the number of slots 31 depends on the design. Each segment 32 represents a continuous area on the main memory 14. The size of the segment 32 depends on the design, and the number of segments 32 in a slot 31 depends on the design. Each block 33 is the smallest unit for managing the user data 30, and, for example, is 512 B and represents a continuous area on the main memory 14.

Then, clean data 33A and dirty data 33B are stored in each block 33. Also, the MP 13 initializes and frees either a block 33 or a segment 32 in which clean data is stored in order to store new dirty data, thereby temporarily creating a free-area block 33C.

In the storage apparatus 1, the maximum capacity for the dirty data capable of being held in the main memory 14 is settably configured by the user.

Figure 4:
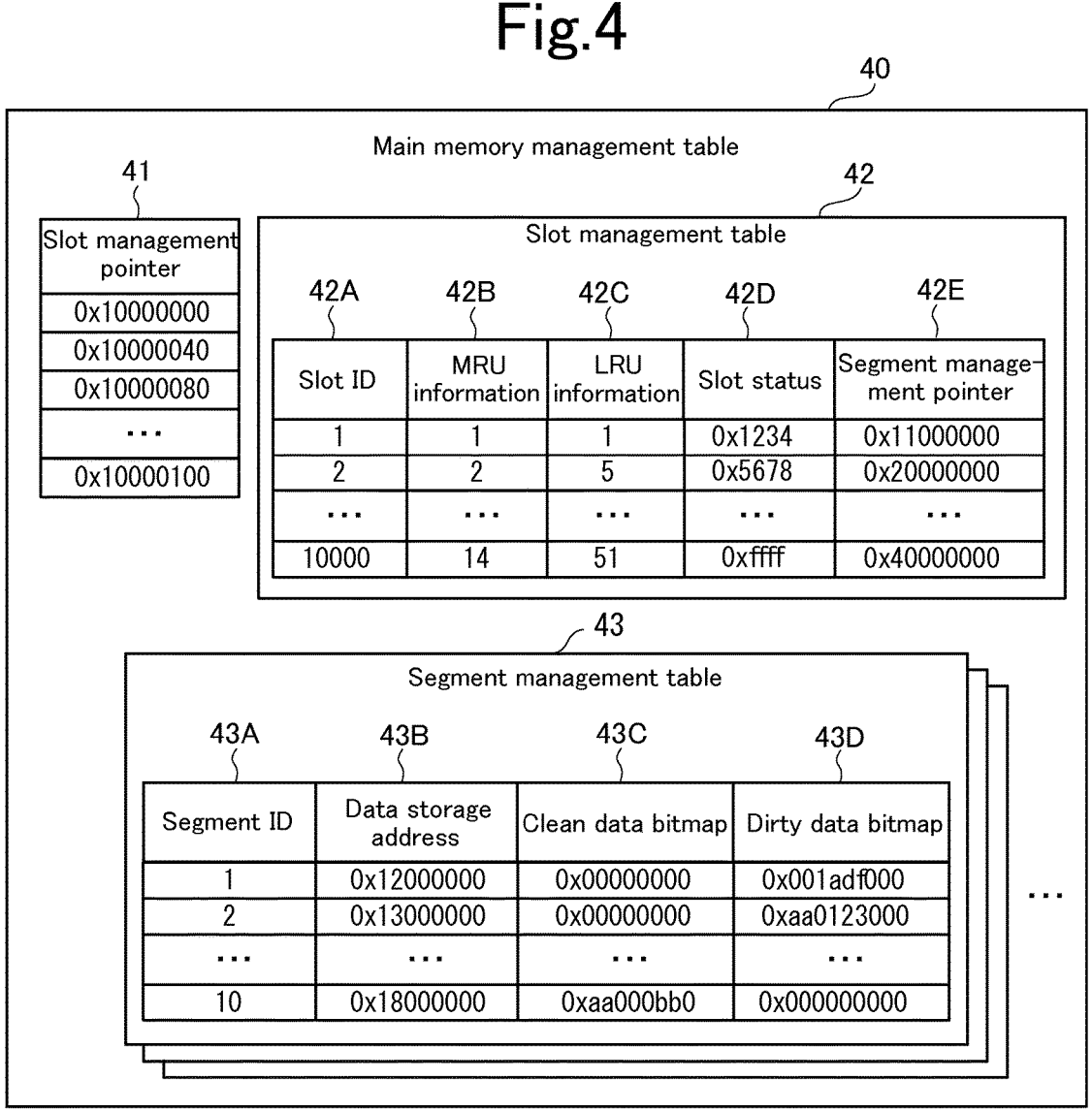
FIG. 4 shows the configuration of a main memory management table.

FIG. 4 shows the configuration of the main memory management table 40.

The main memory management table 40 is for managing the user data 30 stored in the main memory 14. The main memory management table 40 includes a slot management pointer table 41, a slot management table 42, and a segment management table 43.

The slot management pointer table 41 is for managing I/O destination information. That is, the slot management pointer table 41 is information included in an I/O request received from the host computer 2, and stores information representing the I/O destination. Typically, I/O destination information is a logical unit number (LUN) and a logical block addressing (LBA). The LUN is the number of a logical unit (logical volume), and is a number recognized by the host computer 2. The LBA is an address representing an area (logical block) in a logical unit of the storage drive 6.

The slot management pointer table 41 includes a prescribed number of blank entries (records). When an I/O request is received, a slot management pointer, which is the I/O destination information, is written into a blank entry. Then, a record corresponding to a free slot is identified from the slot management table 42, and a slot management pointer is associated with the record. In accordance with this, it is identified where data that has been written to a certain I/O destination (or read from a certain I/O destination) is stored in the main memory 14, which is the cache memory.

One row of the slot management pointer table 41 does not correspond one-to-one basis with one row of the slot management table 42 from the start. This is because to do so would require that pointers equivalent to the capacity of the logical volume be prepared in advance, making it necessary to enlarge the size of the table and the size of the cache.

The slot management table 42 stores a slot ID 42A, which is information for identifying a slot, most recent used (MRU) information 42B, least recent used (LRU) information 42C, a slot status 42D, and a segment management pointer 42E.

The MRU information 42B indicates whether or not the corresponding slot is accessed frequently. The LRU information 42C indicates whether or not the corresponding slot is accessed infrequently.

The slot status 42D stores either clean or dirty cache control information, and information indicating that parity has been created for each segment 32 of a slot 31. In this embodiment, when the percentage of dirty data stored in the main memory 14 and the NVRAM 15 exceeds a prescribed percentage, parity related to the dirty data is created in each segment 32 and a dirty data destage process is executed.

The segment management pointer 42E stores a segment management table pointer corresponding to a segment included in a slot.

A plurality of segment management tables 43 is provided corresponding to each slot. The segment management table 43 stores a segment ID 43A, which is information for identifying a segment, a data storage address 43B, a clean data bitmap 43C, and a dirty data bitmap 43D. The data storage address 43B indicates a location where a segment is arranged. The clean data bitmap 43C indicates a storage location for data that is in the clean state inside the corresponding segment. That is, the clean data bitmap 43C indicates the location where clean data is stored inside the corresponding segment. The dirty data bitmap 43D indicates the storage location for data that is in the dirty state inside the corresponding segment. That is, the dirty data bitmap 43D indicates the location where dirty data is stored inside the corresponding segment.

FIG. 5 shows the configuration of the backup data table 60.

The backup data table 60 is created by the core 13A of the MP 13 on the basis of the main memory management table 40 at the time of a power stoppage. The backup data table 60 is a bitmap table related to backup-target data within the user data 30. That is, the backup data table 60 is for indicating where data targeted for backup is stored. The backup data table 60 stores a slot management pointer 61, a slot ID 62, a segment ID 63, a data size 64, and a data head address 65. Furthermore, data to be saved from the main memory 14 to the NVRAM 15 may include all user data, or dirty data alone, but the backup data table 60 shown in FIG. 5 will be explained as a backup data table for when either data is targeted for backup. The backup data table 60 is equivalent to a target data table, and the backup data is equivalent to target data. Also, the data is being presented as backup data targeted to be backed up from the main memory 14 to the NVRAM 15 at the time of a power stoppage, but is also data that is targeted for restoration from the NVRAM 15 to the main memory 14 when the power has been restored.

The slot management pointer 61, the slot ID 62, and the segment ID 63 respectively correspond to the slot management pointer table 41, the slot ID 42A, and the segment ID 43A in FIG. 4. The data size 64 is the size of the backup data being stored in the corresponding segment. The data head address 65 is the address at the head of the backup data being stored in the corresponding segment.

As mentioned above, an 8-byte CRC is appended to data transferred from the host computer 2 in 512-byte units. In so doing, the addresses deviate by 8 bytes each. Thus, dirty data and clean data become intermixed in the same block. Therefore, managing a backup target by data size and address makes it possible to extract and save only the backup data from the user data 30, enabling the amount of backup data to be reduced.

Figure 6:
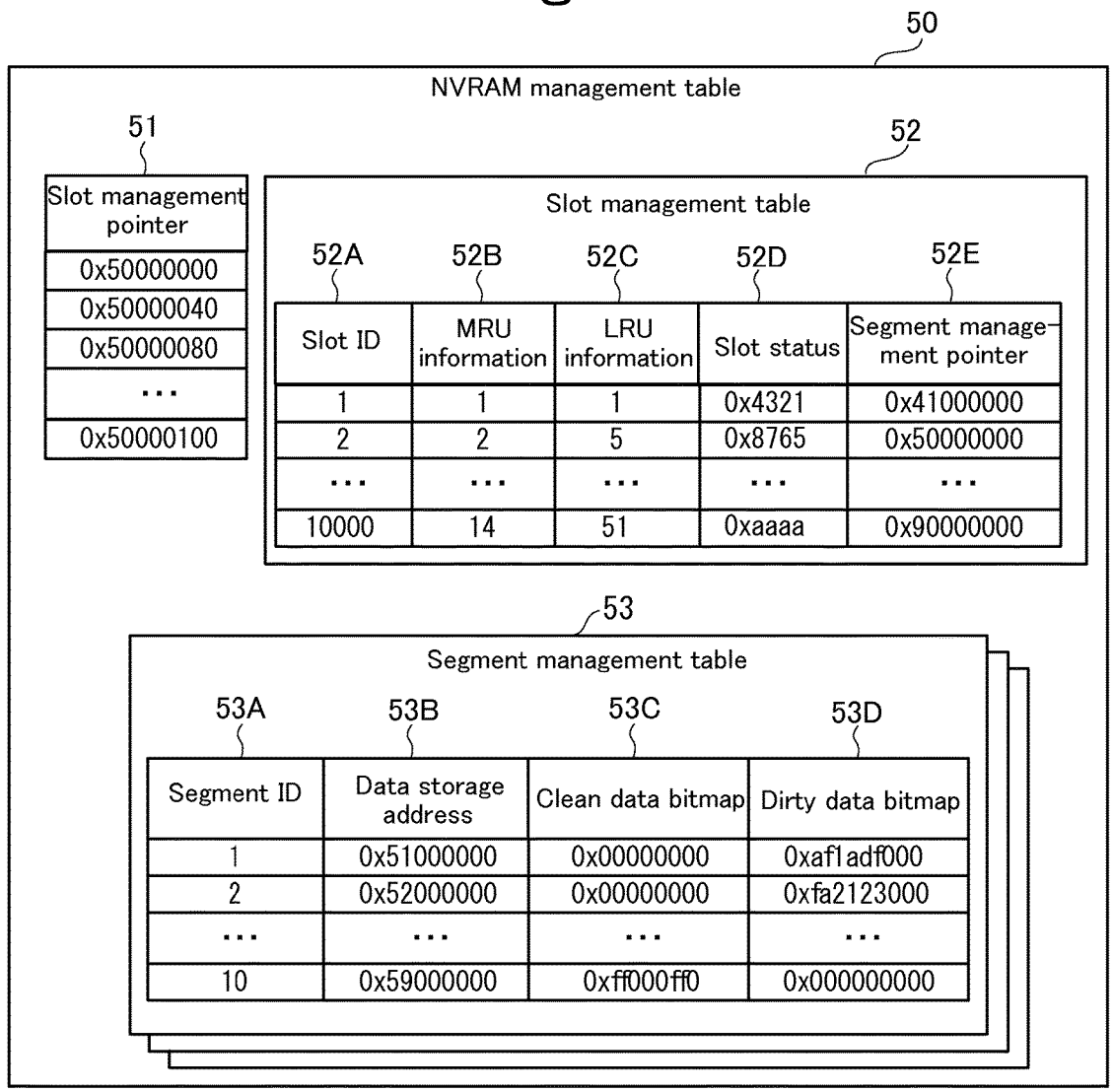
FIG. 6 shows the configuration of an NVRAM management table.

FIG. 6 shows the configuration of the NVRAM management table 50.

The NVRAM management table 50 is for managing the user data 80 stored in the NVRAM 15. The NVRAM management table 50 stores a slot management pointer table 51, a slot management table 52, and a segment management table 53. The slot management pointer table 51, the slot management table 52, and the segment management table 53, respectively, are the same tables as the slot management pointer table 41, the slot management table 42, and the segment management table 43 of the main memory table 40, and as such, a detailed explanation will be omitted.

A slot management pointer of the slot management pointer table 51 indicates I/O destination information the same as the slot management pointer of the slot management pointer table 41, but indicates the I/O destination information of data in the NVRAM 15 that differs from the I/O destination information of the data in the main memory 14. The slot management table 52 includes a slot ID 52A, MRU information 52B, LRU information 52C, a slot status 52D, and a segment management pointer 52E. A plurality of segment management tables 53 is provided corresponding to each slot, and the segment management table 53 includes a segment ID 53A, a data storage address 53B, a clean data bitmap 53C, and a dirty data bitmap 53D.

FIG. 7 shows the configuration of the save-destination data table 70.

The save-destination data table 70 is created by the core 13A of the MP 13 at the time of a power stoppage. The save-destination data table 70 is a bitmap table indicating the save destination (backup destination) for saving dirty data within the user data 30 from the main memory 14 to the NVRAM 15 when there is a power stoppage. The save-destination data table 70 includes a slot management pointer 71, a slot ID 72, a segment ID 73, a data size 74, and a data head address 75. There are some cases that all the user data is saved from the main memory 14 to the NVRAM 15 or only dirty data are saved. However, the save-destination data table 70 shown in FIG. 7 will be explained as a save-destination data table for when either data is targeted for backup.

The slot management pointer 71 corresponds to the slot management pointer 61 of FIG. 5. That is, the I/O destination information (slot management pointer) of the backup data managed in FIG. 5 is also managed in the save-destination data table of FIG. 7. In accordance with this, the backup-target data on the main memory 14 is associated with the data to be saved on the NVRAM 15. Then, when the backup data is restored to the main memory 14, it is enabled to write the backup data to the I/O destination indicated by the slot management pointer (I/O destination information) of the table in FIG. 7.

The slot ID 72 and the segment ID 73 respectively correspond to the slot ID 62 and the segment ID 63 in FIG. 5. The save-destination data size 74 is the size of the dirty data stored in the corresponding segment. The save-destination data head address 75 indicates the head address of the dirty data stored in the corresponding segment.

Figure 8:
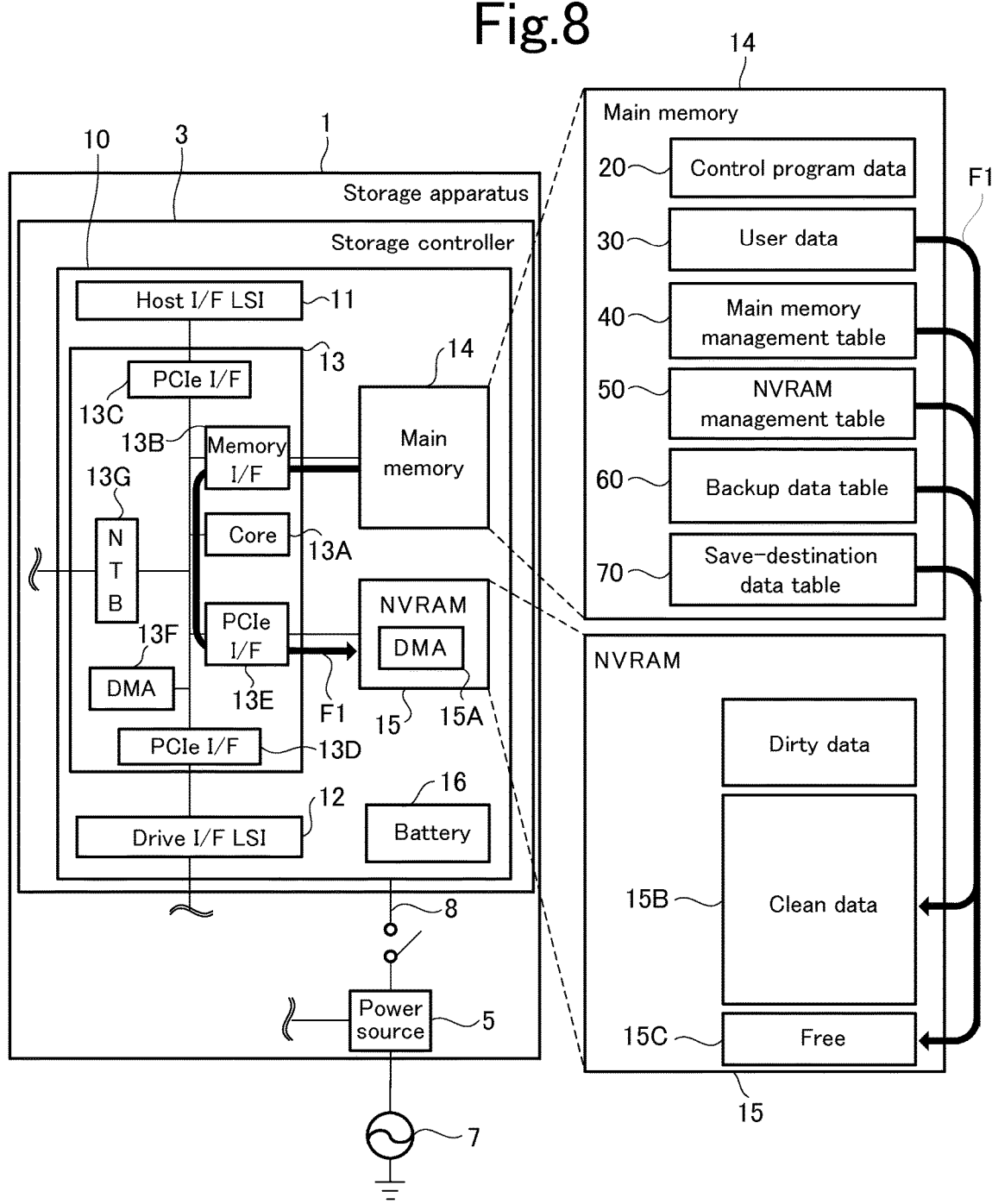
FIG. 8 shows a backup processing operation by the storage controller when there is a power stoppage in the storage apparatus according to the first embodiment.

FIG. 8 shows a backup processing operation by the storage controller 3 when there is a power stoppage in the storage apparatus 1 in the first embodiment. FIG. 8 only shows the backup processing operation for the one cluster 10.

The cluster 10 starts the backup process when there is a drop in voltage due to a power source 5 malfunction or the like, and the circuit 8 that supplies the electrical power from the power source 5 to the storage controller 3 has transitioned to an open state. The backup process represents processing for executing a data transfer F1 of the user data 30, the main memory management table 40, the NVRAM management table 50, the backup data table 60, and the save-destination data table 70, which are being stored in the main memory 14, to a clean data area 15B and a free area 15C of the NVRAM 15. That is, in the backup process, the backup data is stored in the remaining areas (the clean data area 15B and the free area 15C) other than the dirty data area. The specific processing operation of the backup process will be explained below. During the backup process, the cluster 10 runs on the battery 16.

Figure 9:
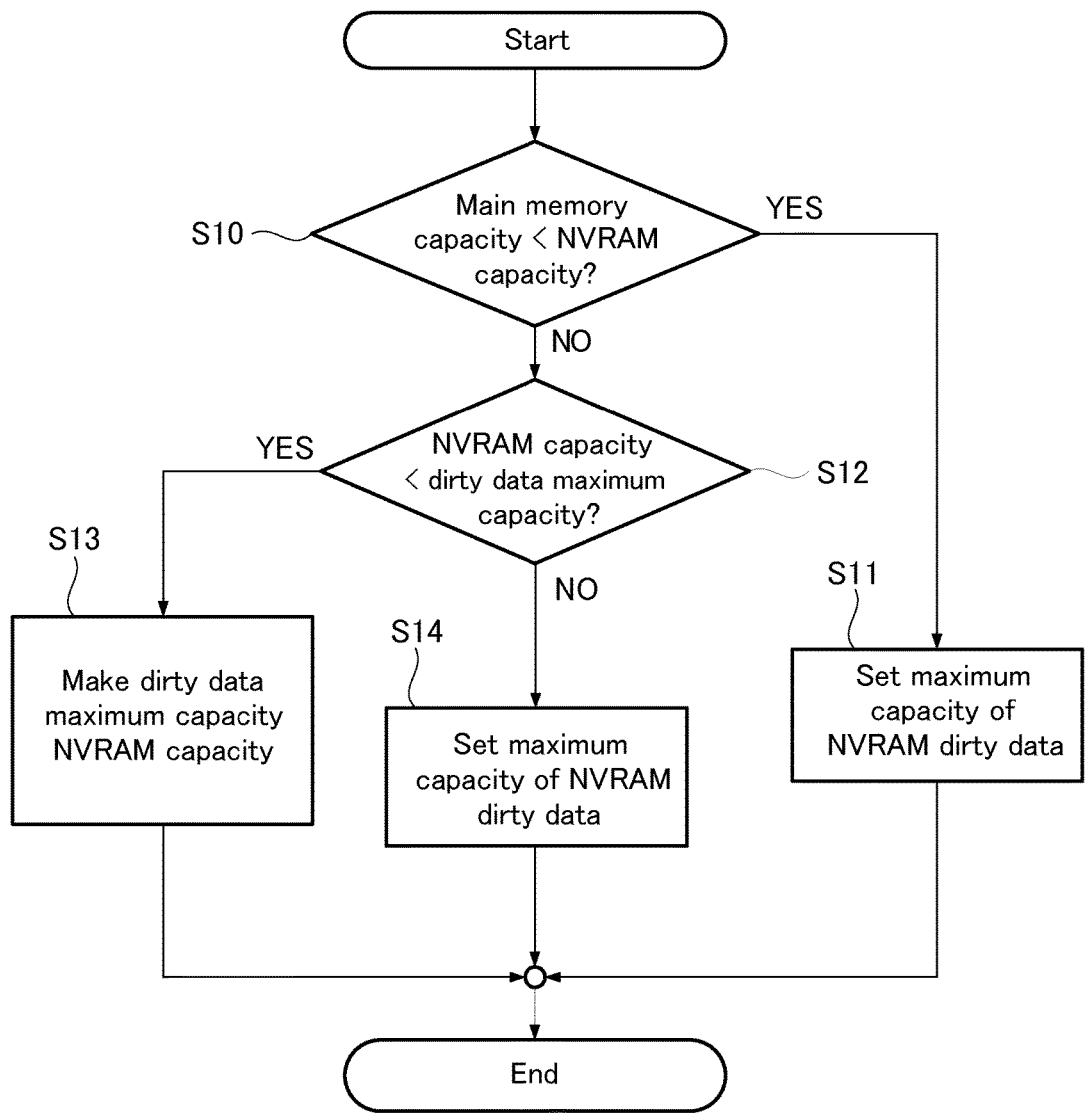
FIG. 9 shows a flowchart of a maximum dirty capacity determination process.

FIG. 9 shows a flowchart of a maximum dirty capacity determination process. This process is executed either when the storage apparatus 1 boots up, or when the user changes the maximum capacity of the dirty data capable of being held in the main memory 14.

The MP 13 acquires capacity information of the main memory 14 and capacity information of the NVRAM 15, and determines whether or not the NVRAM capacity is larger than the main memory capacity (S10). When it has been determined that the NVRAM capacity is larger than the main memory capacity (S10: YES), the MP 13 configures the difference between the NVRAM capacity and the main memory capacity as the maximum capacity of the dirty data capable of being held in the NVRAM 15 (S11). Since the main memory 14 has higher write performance, holding the dirty data in the main memory 14 makes it possible to maintain the performance of the storage apparatus 1.

When it has been determined that the NVRAM capacity is equal to or less than the main memory capacity (S10: NO), the MP 13 determines whether or not the NVRAM 15 is smaller than the maximum capacity of the dirty data capable of being held in the main memory 14 (S12). When it has been determined that the NVRAM capacity is smaller than the maximum capacity of the dirty data capable of being held in the main memory 14 (S12: YES), the MP 13 changes the settings of the storage apparatus 1 such that the maximum capacity of the dirty data capable of being held in the main memory 14 is identical to the capacity of the NVRAM 15 (S13). In addition, the MP 13 also sets the capacity of the dirty data capable of being held in the NVRAM 15 to 0 (S13). In this case, only clean data is stored in the NVRAM 15. In accordance with this, since the main memory 14 exhibits a higher write performance, holding the dirty data in the main memory 14 makes it possible to maintain the performance of the storage apparatus 1.

In the processing of Step S13, when dirty data is being stored in the NVRAM 15, all of the dirty data may be written (destaged) to the storage drive 6 to convert the NVRAM 15 to an all clean state. Also, in the processing of Step S13, when the amount of dirty data stored in the main memory 14 exceeds the maximum capacity of the dirty data capable of being held in the main memory 14, the excess dirty data may be written to the storage drive 6.

When it has been determined that the capacity of the NVRAM 15 is equal to or larger than the maximum capacity of the dirty data capable of being held in the main memory 14 (S12: NO), the MP 13 configures the difference between the NVRAM capacity and the maximum capacity of the dirty data that can be held in the main memory 14 as the maximum capacity of the dirty data capable of being held in the NVRAM 15 (S14). In accordance with this, the NVRAM 15 holds clean data in proportion to the maximum capacity of the dirty data capable of being held in the main memory 14.

Figure 10:
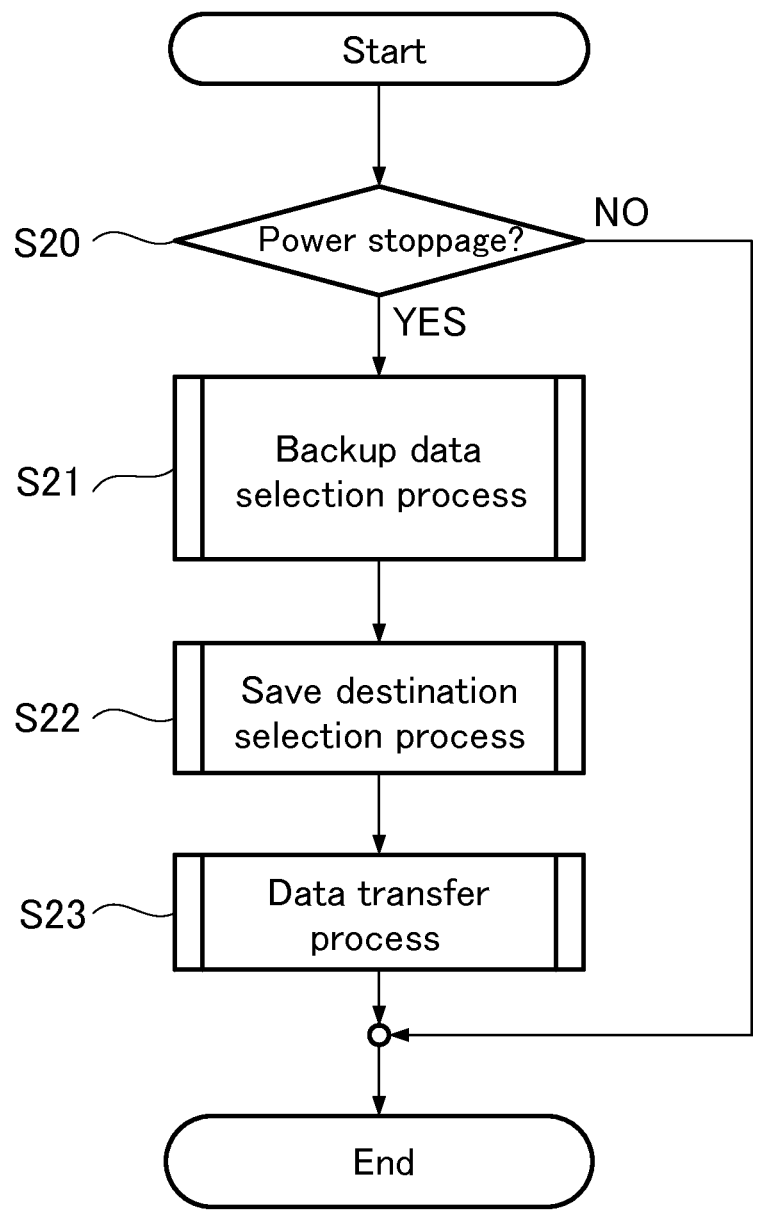
FIG. 10 shows a flowchart of a backup process.

FIG. 10 shows a flowchart of the backup processing of the storage apparatus 1 at the time of a power stoppage.

First, the MP 13 determines whether or not there has been a drop in voltage due to a power source 5 malfunction or the like, and the circuit 8 that supplies the electrical power from the power source 5 to the storage controller 3 has transitioned to an open state (S20). That is, the MP 13 determines whether or not a power stoppage has occurred. When a power stoppage has not occurred (S20: NO), the backup process ends. Alternatively, when a power stoppage has occurred (S20: YES), the MP 13 executes a backup data selection process for selecting the backup-target data on the main memory 14 (S21). The backup data selection process will be explained in detail below. When the backup data selection process ends, the MP 13 executes a save destination selection process for selecting a backup data save destination from the NVRAM 15 (S22). The save destination selection process will be explained in detail below. After the save destination selection process has ended, the MP 13 executes a data transfer process for transferring the backup data selected in Step S21 to the save destination selected in Step S22 (S23). The data transfer process will be explained in detail below. Once the data transfer process is complete, the storage apparatus 1 ends the backup process.

Figure 11:
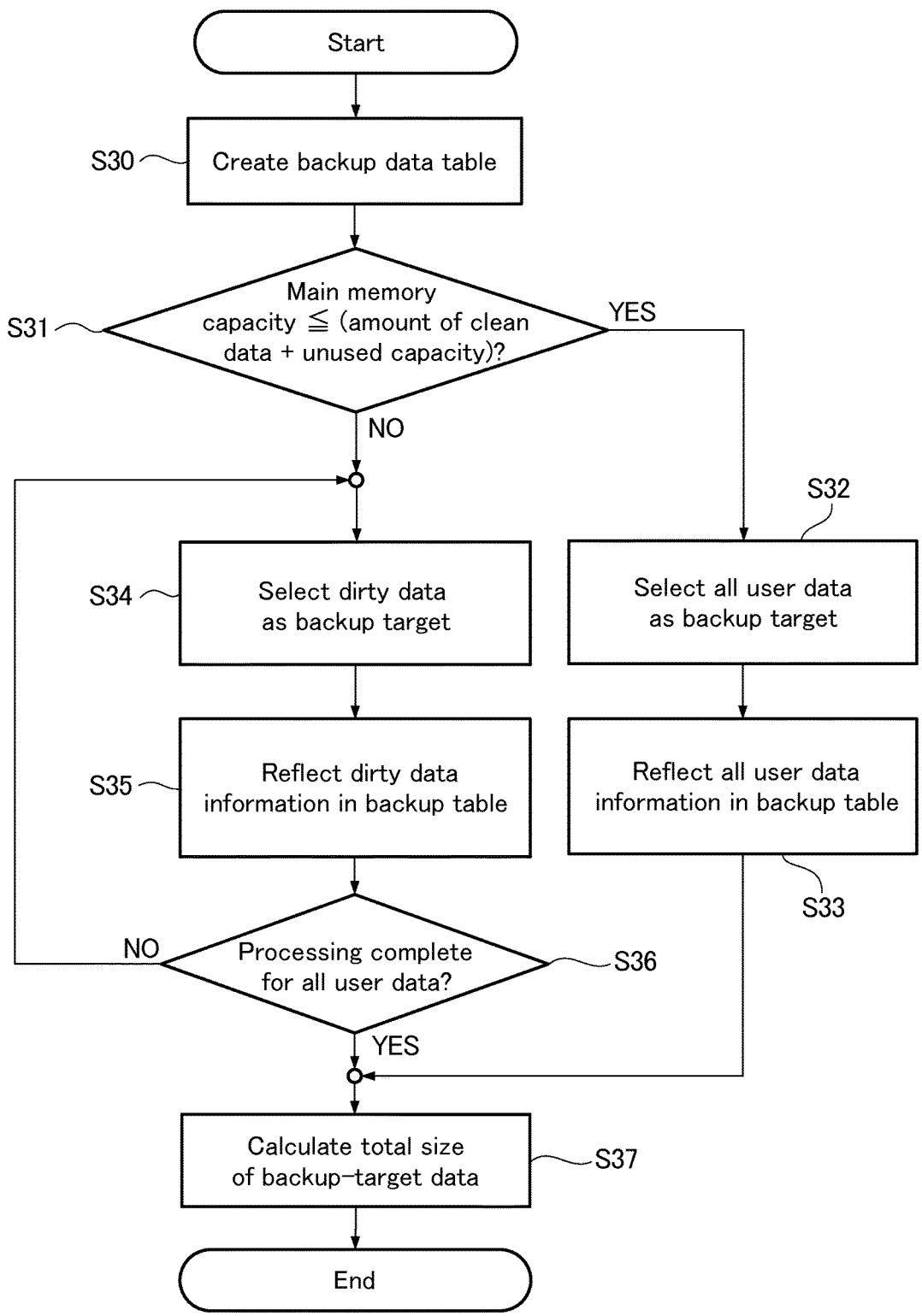
FIG. 11 shows a flowchart of a backup data selection process according to the first embodiment.

FIG. 11 shows a flowchart of the backup data selection process for selecting backup data on the main memory 14.

The MP 13 creates a backup data table 60 (S30). At this time point, the backup data table 60 is empty. Next, the MP 13 determines whether or not the capacity of the main memory 14 is equal to or less than the total of the clean data capacity and the free capacity on the NVRAM 15 (S31). When it has been determined that the capacity of the main memory 14 is equal to or less than the total (S31: YES), the MP 13 selects all the data on the main memory 14 as the backup target (S32). In accordance with this, since all of the data is selected uniformly, the processing time for determining the backup-target data one by one is reduced. Accordingly, it becomes possible to reduce the backup process time as a whole.

The MP 13 reflects information on all the user data selected in Step S32 in the backup data table (S33). Specifically, on the basis of the main memory management table 40, the MP 13 reflects slot pointers, slot IDs, segment IDs, data sizes, and data head addresses in the backup data table 60. In accordance with this, a backup data table 60 related to all the user data shown in FIG. 5 is created.

Alternatively, when is has been determined that the main memory capacity is larger than the total (S31: NO), it is not possible to select all of the data on the main memory. Thus, the MP 13, on the basis of the main memory management table 40, identifies slots and segments storing dirty data and selects the dirty data as the backup target (S34). At this time, the size of the identified dirty data is calculated from the dirty data bitmap 43D. Next, the MP 13, on the basis of the identified dirty data information, reflects the slot pointers, slot IDs, segment IDs, data sizes of the dirty data, and data head addresses of the dirty data in the backup data table 60 (S35). In accordance with this, the backup data table 60 shown in FIG. 5 is created as the backup data.

Next, the MP 13 determines whether or not the dirty data determination process has been completed for all the user data (S36). When the determination process has not been completed, the MP 13 returns Step S34 (S36: NO), and repeats the dirty data selection process. When it has been determined that the dirty data determination process is complete for all the user data (S36: YES), the MP 13, on the basis of the backup data table 60 created in Step S33 and Step S35, calculates the total size of the backup data being targeted for backup (S37). After computing the total size of the backup data in Step S37, the MP 13 ends the backup data selection process.

Figure 12:
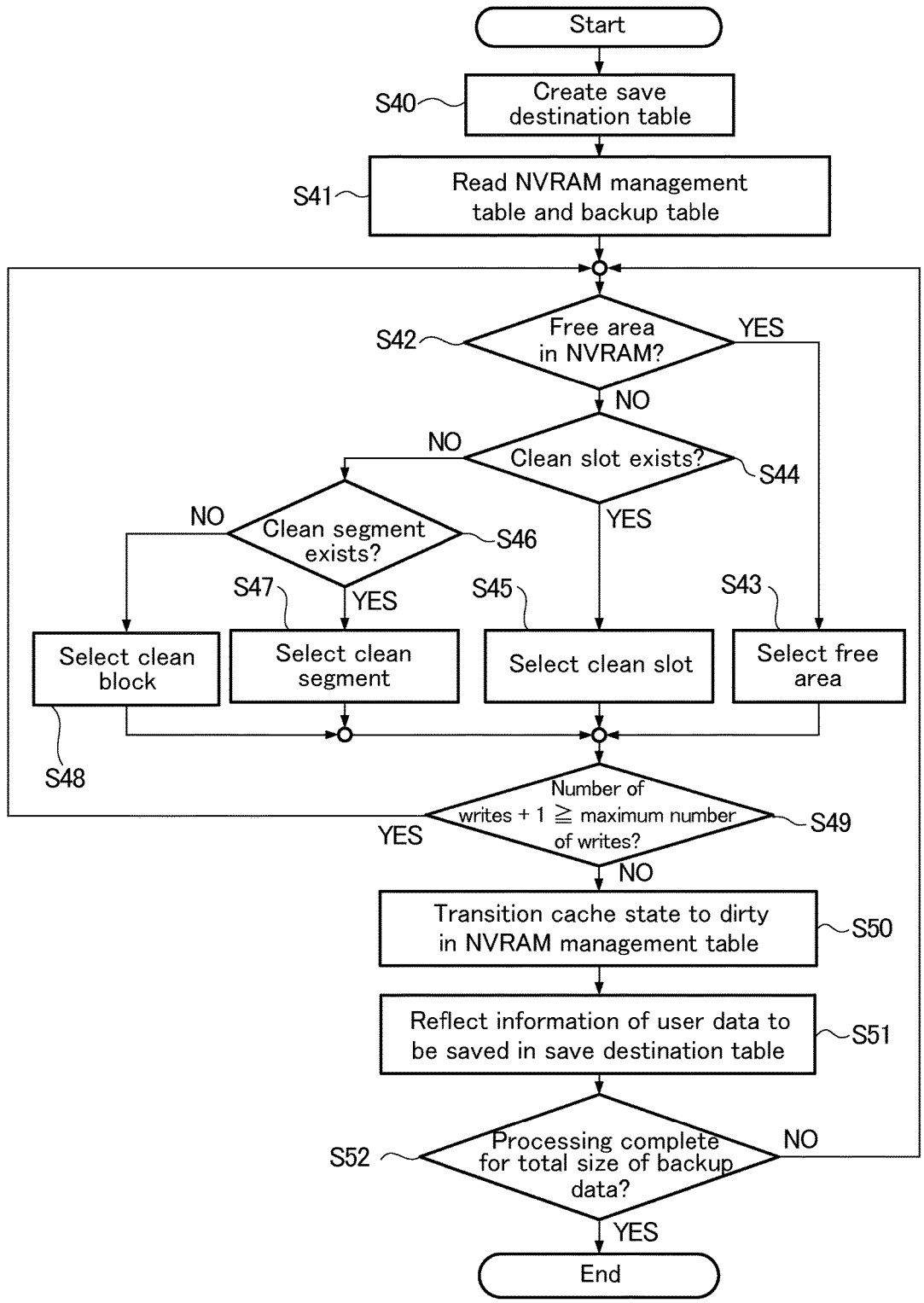
FIG. 12 shows a flowchart of a save destination selection process according to the first embodiment.

FIG. 12 is a flowchart of the save destination selection process for selecting a backup data save destination from the NVRAM 15.

The MP 13 creates a save-destination data table on the basis of the NVRAM management table 50 (S40). At this time point, there is no data at all reflected in the save-destination data table. The MP 13 reads the NVRAM management table 50 and the backup data table 60 created in the backup data selection process of FIG. 11 (S41).

In order to enhance the capacity efficiency of the NVRAM 15 at this time, the MP 13 selects a user data area in which clean data is stored as the backup data storage destination without configuring a data save area for backup use on the NVRAM 15. Thus, the MP 13 must read the user data management table in the NVRAM 15, and identify the location of the clean data that will become the backup data storage destination. The order of preference for selecting the backup storage destinations at this time is as follows: (1) a free area in which user data is not stored; (2) a clean-state slot from among the slots, the largest data management units; (3) a clean-state segment from among the segments, the next largest data management units; and (4) a clean-state block from among the blocks, the smallest data management units. Selecting the backup storage destinations in order from the largest area like this makes it possible to shorten the write time from the main memory 14 to the NVRAM 15. Accordingly, the time required to supply electrical power to the cluster 10 from the battery 16 can be shortened, enabling capacity of the battery 16 to be reduced.

As used here, clean state indicates a state in which all of the data stored in the corresponding area is clean data, and dirty data is not being stored.

The MP 13 determines whether or not there is a free area in the NVRAM 15 on the basis of the NVRAM management table 50 (S42). When there is a free area in the NVRAM 15 (S42: Yes), the MP 13 selects the free area (S43). Alternatively, when there are no free areas in the NVRAM 15 (S42: NO), the MP 13 determines whether or not there is a clean-state slot in the NVRAM 15 (S44). When a clean-state slot exists in the NVRAM 15 (S44: YES), the MP 13 selects the clean-state slot (S45). When there are no clean-state slots in the NVRAM 15 (S44: NO), the MP 13 determines whether or not there is a clean-state segment in the NVRAM 15 (S46). When a clean-state segment exists in the NVRAM 15 (S46: YES), the MP 13 selects the clean-state segment (S47). When there are no clean-state segments in the NVRAM 15 (S46: NO), the MP 13 selects a clean-state block (S48). The MP 13 selects the save area in this manner, thereby making it possible to leave behind as much clean data as possible in the NVRAM 15.

After the save destination selection processes, the MP 13 determines whether or not the number of times obtained by adding 1 to the number of writes for the selected area exceeds a maximum number of writes possible (S49). When the number of times obtained by adding 1 to the number of writes for the selected area is equal to or larger than the maximum number of writes possible (S49: YES), the MP 13 returns to S42 and repeats the save destination selection process. Alternatively, when the number of times obtained by adding 1 to the number of writes for the selected area is less than the maximum number of writes possible (S49: NO), the MP 13 transitions the cache state of the selected save area to dirty in the NVRAM management table 50 (S50). Transitioning to dirty makes it possible to prevent the backup data from being discarded accidently at recovery time. The MP 13 allocates the user data to be saved to the selected area, and reflects the slot pointer, the slot ID, the segment ID, the data size, and the data head address related to the allocated user data in the save-destination data table 70 (S51).

Next, the MP 13 determines whether or not a save area having a size equal to the total size of the backup data calculated in S37 of FIG. 11 was selected (S52). When it has been determined that a save area having a size equal to the total size of the backup data has been selected (S52: YES), the MP 13 ends the save destination selection process. Alternatively, when it has been determined that a save area having a size equal to the total size of the backup data has not been selected (S52: NO), the MP 13 returns to Step S42.

Figure 13:
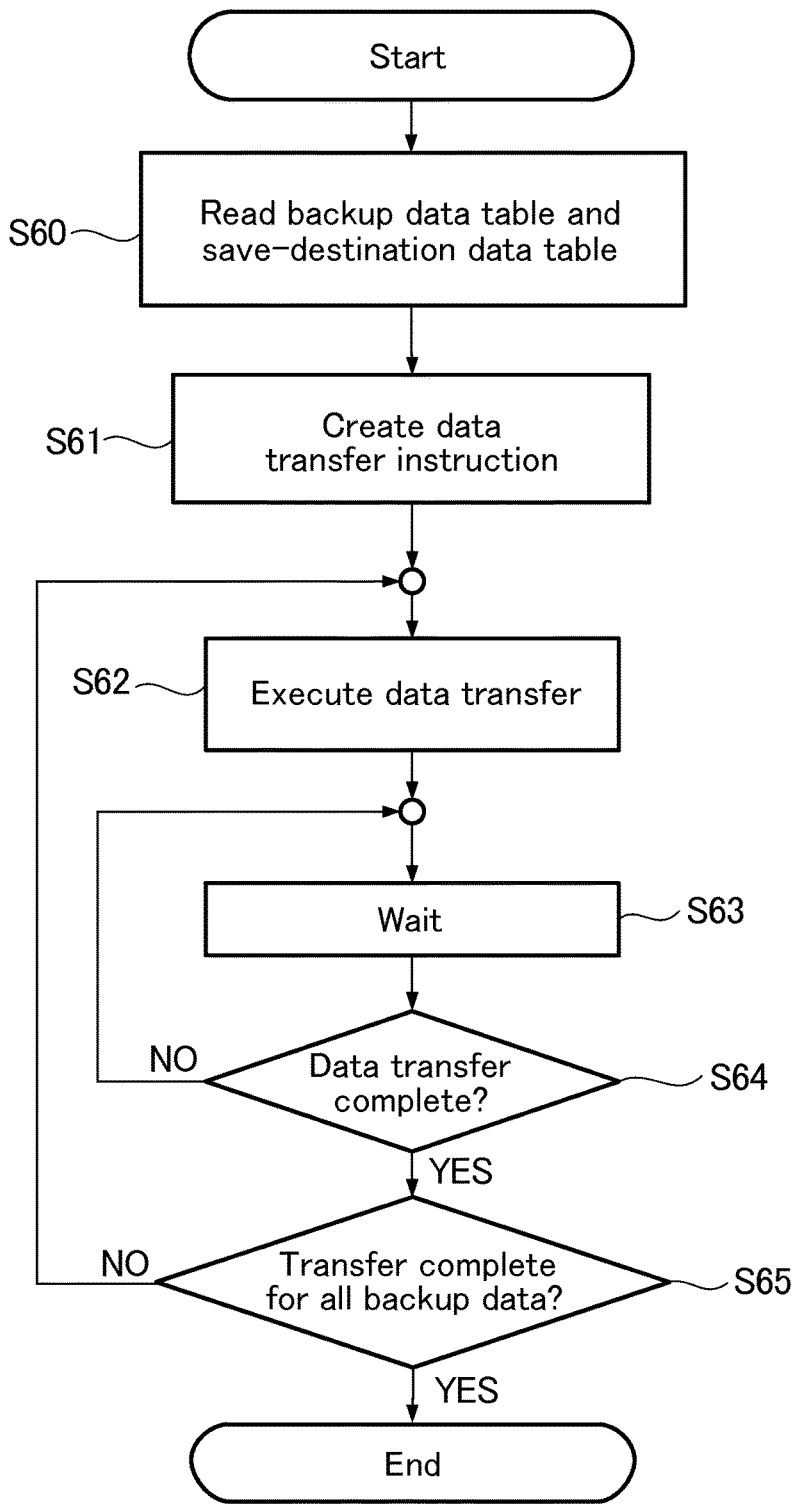
FIG. 13 shows a flowchart of a data transfer process according to the first embodiment.

FIG. 13 shows a flowchart of a data transfer process for transferring backup data from the main memory 14 to the NVRAM 15.

The MP 13 reads the backup data table 60 and the save-destination data table 70 (S60). Next, the MP 13, on the basis of the two tables that were read, creates a data transfer instruction in the main memory 14 for transferring data via the DMA 15A of the NVRAM 15 (S61). The main memory management table 40, the NVRAM management table 50, the backup data table 60, and the save-destination data table 70 are included as transfer targets at this time. Next, the MP 13 reads the created data transfer instruction to the DMA 15A, and executes a data transfer to the DMA 15A (S62).

After executing the data transfer to the DMA 15A, the MP 13 waits for a fixed period of time (S63), and then determines whether or not the data transfer has been completed by the DMA 15A (S64). When the data transfer has not been completed (S64: NO), the MP 13 returns to Step S63 and waits. When the data transfer has been completed (S64: YES), the MP 13 determines whether or not the transfer of all the backup data has been completed (S65). When the transfer of all of the backup data has not been completed (S65: NO), the MP 13 returns to Step S62 and repeats the transfer process. When the transfer of all of the backup data has been completed (S65: YES), the MP 13 ends the data transfer process.

Figure 14:
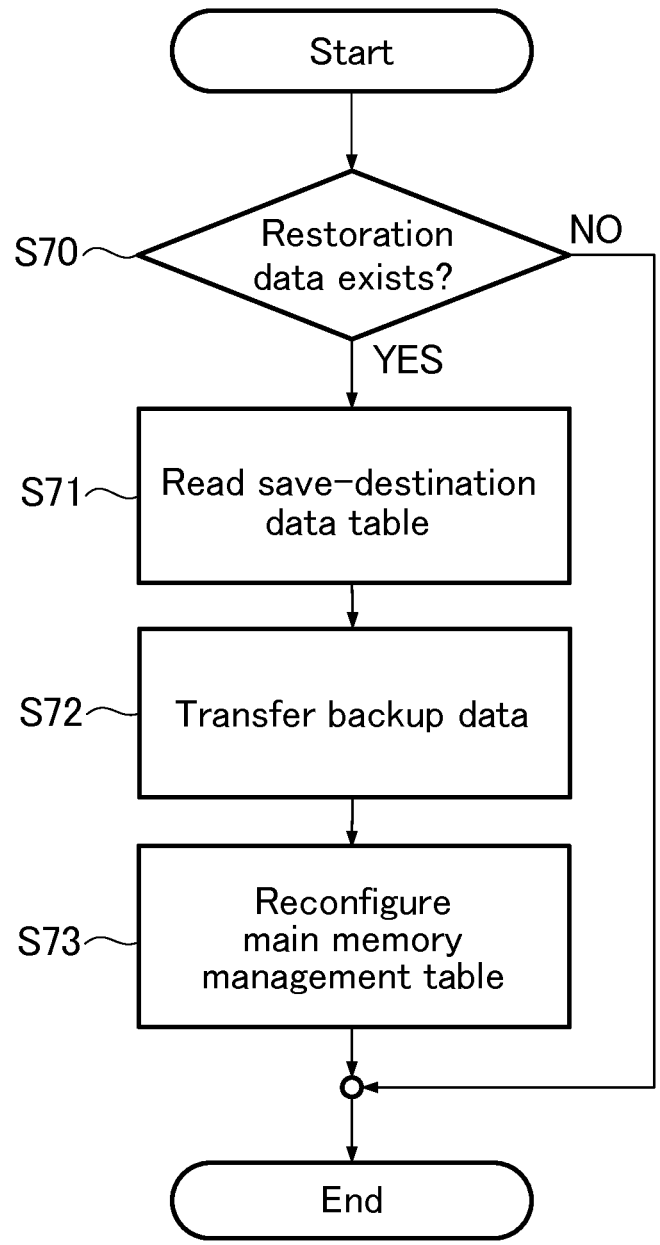
FIG. 14 shows a flowchart of a backup data restoration process according to the first embodiment.

FIG. 14 shows a flowchart of a backup data restoration process by the MP 13 when power has been restored.

The MP 13 determines whether or not restoration data exists in the NVRAM 15 (S70). For example, the MP 13 determines whether or not the backup data table 60 and the save-destination data table 70 are stored in the NVRAM 15. When it has been determined that restoration data does not exist in the NVRAM 15 (S70: NO), the MP 13 ends the restoration process. Alternatively, when it has been determined that restoration data does exist in the NVRAM 15 (S70: YES), the MP 13 reads the save-destination data table 70 from the NVRAM 15 and identifies the backup data on the NVRAM 15 (S71).

Next, the MP 13, in order to reallocate the identified backup data to the main memory 14 in Step S72, transfers the identified backup data from the NVRAM 15 to the main memory 14 in Step S72 (S72). The MP 13 also transfers the main memory management table 40 and the NVRAM management table 50. The MP 13 refers to the backup data table 60, reconfigures the main memory management table 40 (S73), and ends the restoration process. The MP 13 may also reconfigure the NVRAM management table 50 by referring to the save-destination data table 70.

At backup data transfer time, the MP 13 checks the CRC code appended to the backup data, and when a CRC error is detected, discards the data.

As described hereinabove, at the time of a power stoppage, data stored in the main memory 14 is saved to a free area and/or a clean data area of the NVRAM 15, thereby making it possible to enhance the capacity efficiency of the NVRAM 15. Also, since there is no need to provide a nonvolatile memory for saving backup data, cost increases can be prevented. Also, since backup data is saved to the NVRAM 15, which is used as a cache memory, data transfer time can be shortened, battery 16 capacity can be reduced, and costs can be lessened.

A storage apparatus 101 in a second embodiment of the present invention will be explained next.

Figure 15:
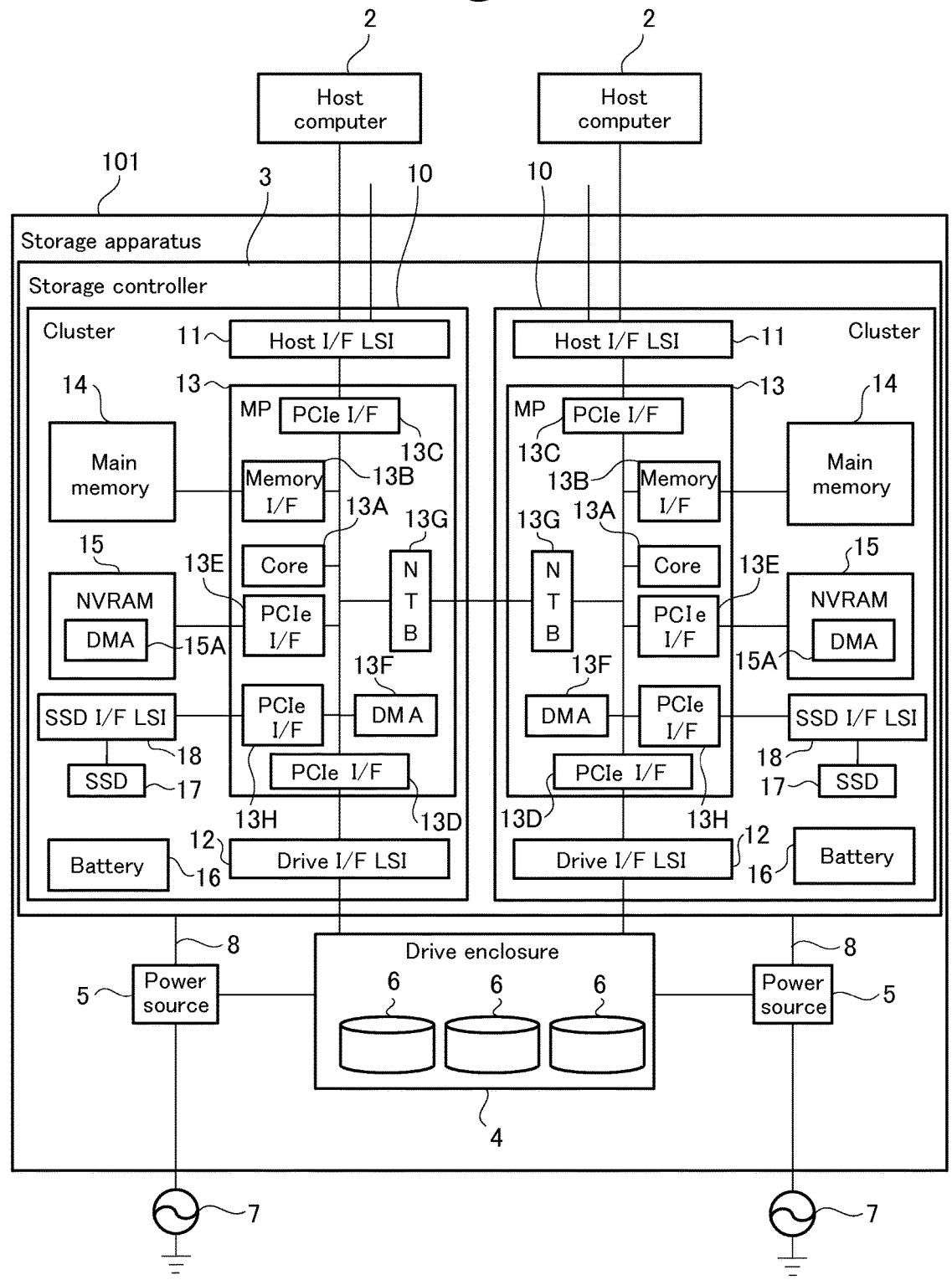
FIG. 15 shows a storage system according to a second embodiment.

FIG. 15 shows the storage apparatus 101 that makes up the storage system in the second embodiment. The same numbers will be assigned and explanations omitted for configurations that are the same as the first embodiment; only the different parts of the configuration will be explained.

As shown in FIG. 15, each cluster 10 in this embodiment includes an SSD 17, which is a nonvolatile medium dedicated to backup, and an SSD I/F LSI 18. The SSD 17 is a storage device including a semiconductor memory, such as a NAND-type flash memory, a phase change RAM (PCM), a resistance RAM (ReRAM), or the like, and the capacity thereof is between 1 TB and 2 TB. The SSD 17 is normally connected to the MP 13 via a SATA interface. Also, the SSD 17 has a higher data recording density per area than a DRAM, but has low data-read and data-write rates, and data can only be rewritten a small number of times. In this embodiment, the SSD 17 is only used for saving data stored in the main memory 14 at the time of a power stoppage, and does not store data read/written from/to the host computer 2 other than at backup processing time. The SSD I/F LSI 18 is a controller for the SSD 17 to communicate with the MP 13.

Figure 16:
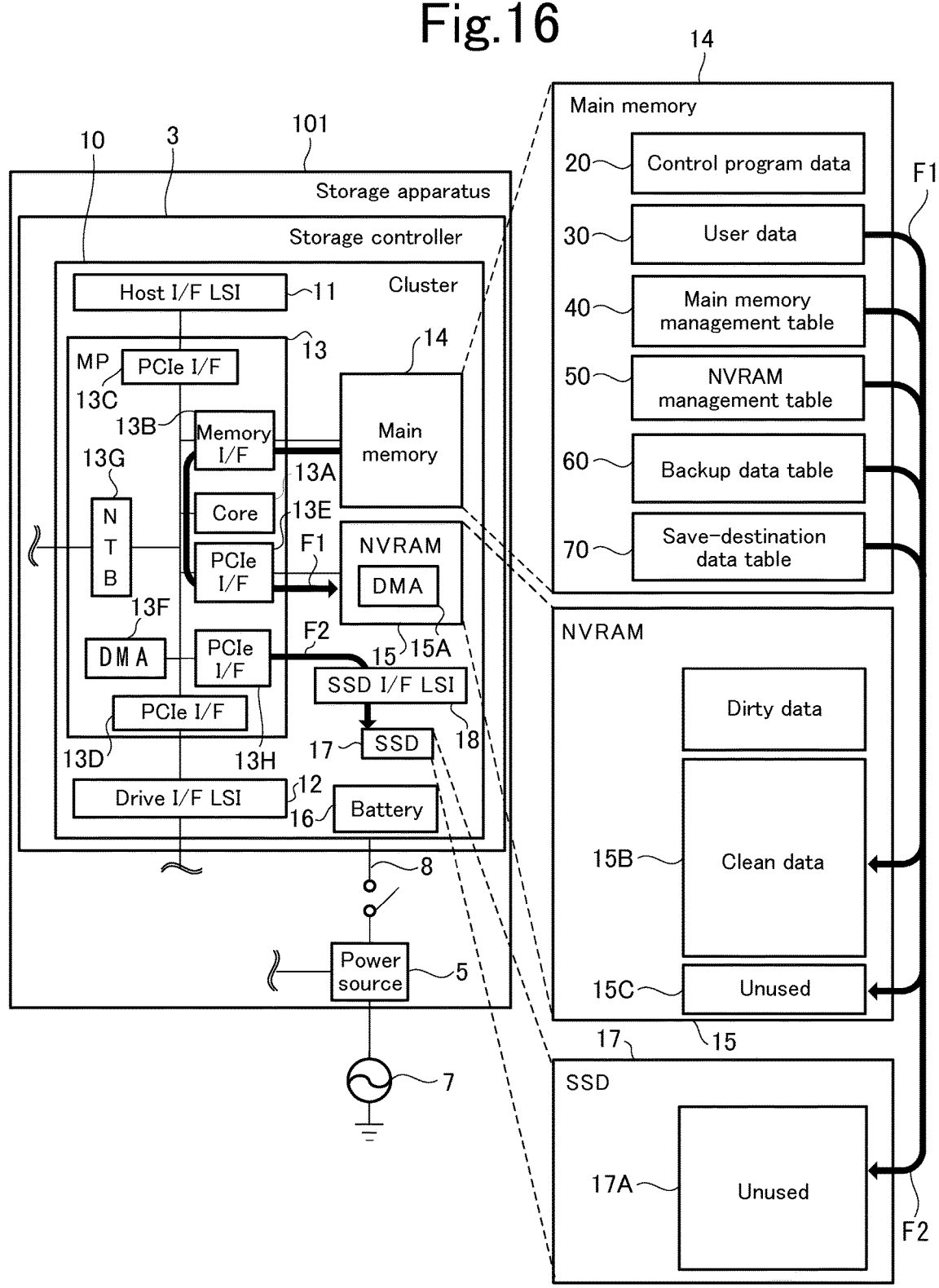
FIG. 16 shows a backup processing operation by the storage controller when there is a power stoppage in the storage apparatus of the second embodiment.

FIG. 16 shows a backup processing operation by the storage controller 3 when there is a power stoppage in the storage apparatus 101 of this embodiment. FIG. 16 only shows the backup processing operation in the one cluster 10.

The cluster 10 starts the backup process when there is a drop in voltage due to a power source 5 malfunction or the like, and the circuit 8 that supplies the electrical power from the power source 5 to the storage controller 3 has transitioned to an open state. The backup process in this embodiment executes a data transfer F1 to a clean data area and a free area of the NVRAM 15 and a data transfer F2 to the SSD 17, of the user data 30, the main memory management table 40, the NVRAM management table 50, the backup data table 60, and the save-destination data table 70, which are being stored in the main memory 14. Thus, in the backup process of this embodiment, unlike the backup process of the first embodiment, a backup data transfer from the main memory 14 to the SSD 17 is executed in parallel to the a backup data transfer from the main memory 14 to the NVRAM 15. The specific processing operation of the backup process will be explained below.

In this embodiment, the same backup process as that of FIG. 10 of the first embodiment is executed. However, in this embodiment, the backup data save destination determination process of FIG. 17 is executed in place of Step S22.

Figure 17:
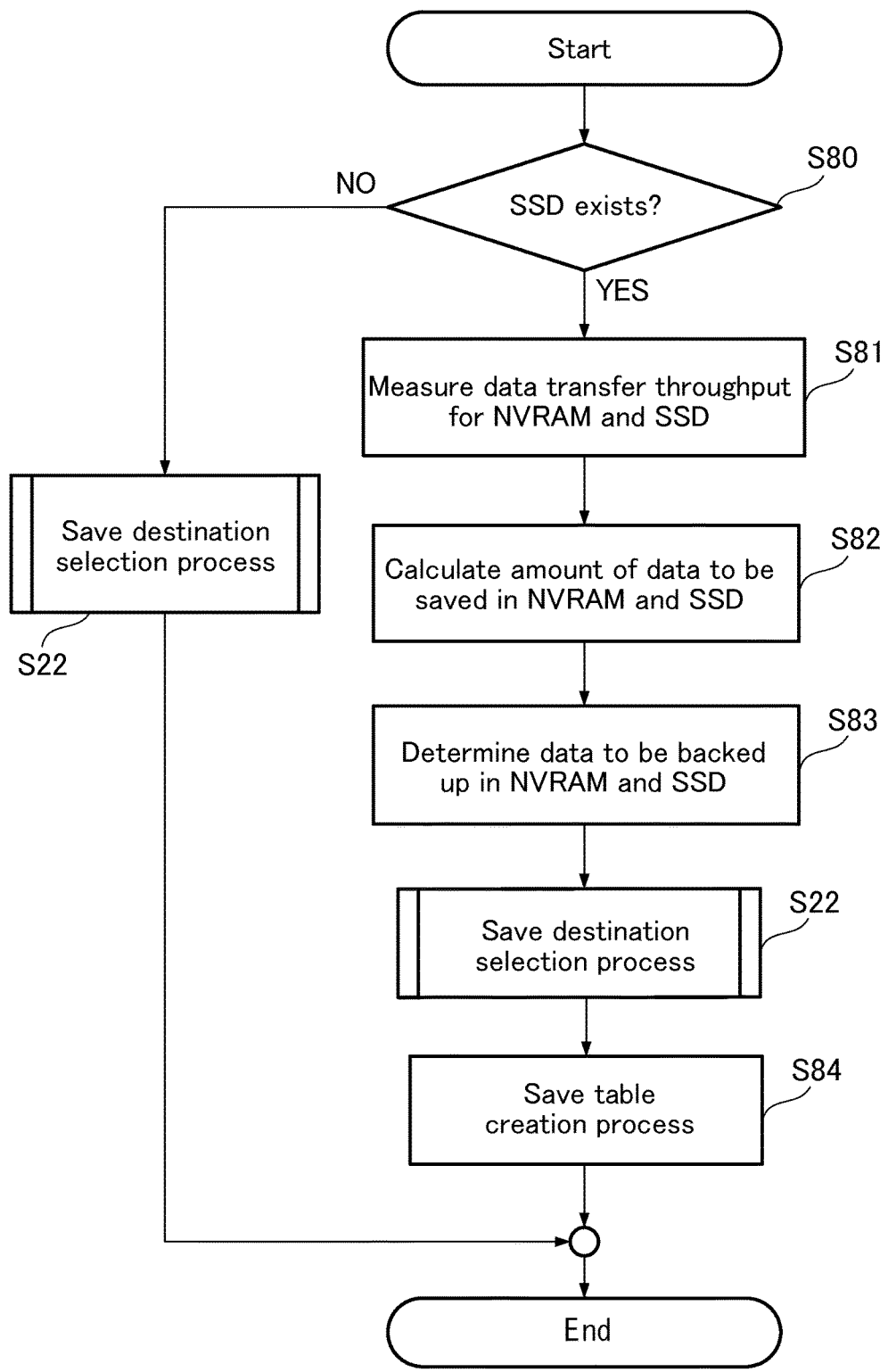
FIG. 17 shows a flowchart of a backup data save destination determination process according to the second embodiment.

FIG. 17 shows a flowchart of a backup data save destination determination process in this embodiment.

The MP 13 determines whether or not an SSD 17 exists in the cluster 10 (S80). When it has been determined that the SSD 17 does not exist (S80: NO), the MP 13 executes the same processing as that of Step S22 in FIG. 10. That is, since the NVRAM 15 is the only backup data save destination, only the processing of FIG. 12 is executed.

Alternatively, when it has been determined that the SSD 17 exists (S80: YES), because there are two nonvolatile media that are backup data storage destinations, the MP 13 executes a process for configuring the amount of data to be stored in each medium. First, the MP 13 measures the data transfer throughputs of the NVRAM 15 and the SSD 17 (S81). For example, the MP 13 creates dummy data, executes dummy transfers from the main memory 14 to the NVRAM 15 and the SSD 17, and calculates the data transfer amounts per second based on the data transfer amounts and the data transfer times. In accordance with this, the data transfer throughput of the NVRAM 15 ($V_{NVRAM}$ [GB/S]) and the data transfer throughput of the SSD 17 ($V_{SSD}$ [GB/S]) are measured.

Next, the MP 13 uses the following formulas (1) and (2) to calculate the amounts of data to be backed up on the NVRAM 15 and the SSD 17 (S82).

[Formula 1]
$$B_{SSD} = C_{MaxDirty} \times \frac{V_{SSD}}{V_{SSD} + V_{NVRAM}} \quad \text{Formula 1}$$

[Formula 2]
$$B_{NVRAM} = C_{MaxDirty} \times \frac{V_{NVRAM}}{V_{SSD} + V_{NVRAM}} \quad \text{Formula 2}$$

The variables here are:
$V_{SSD}$: Data transfer throughput [GB/S] of SSD measured in Step S81;
$V_{NVRAM}$: Data transfer throughput [GB/S] of NVRAM measured in Step S81;
$C_{MaxDirty}$: Amount of dirty data [GB] stored in the main memory;
$B_{SSD}$: Amount of data [GB] to be backed up on SSD; and
$B_{NVRAM}$: Amount of data [GB] to be backed up on NVRAM.

Next, the MP 13 determines the data to be backed up on each of the NVRAM 15 and the SSD 17 on the basis of the $B_{NVRAM}$ [GB] and the $B_{SSD}$ [GB] calculated in Step S82. The MP 13 executes the same processing as that of Step S22 in FIG. 10 for Step S83—determined backup data to be saved to the NVRAM 15.

Next, the MP 13 creates a save table not shown in the drawing for the Step 83—determined backup data to be saved to the SSD 17 (S84). In the save table, at least the I/O destination information and the backup data are associated. This makes it possible to write the backup data to the I/O destination indicated by the I/O destination information when restoring the backup data to the main memory 14. After the save destination determination process, the MP 13 ends the save destination determination process. Since the amount of data to be backed up is determined on the basis of the data transfer throughputs of the NVRAM 15 and the SSD 17 like this, the data transfers to each of the NVRAM 15 and the SSD 17 can be ended at the same time. Accordingly, the time required for saving the backup data can be minimized, and the battery 16 capacity can be reduced.

Figure 18:
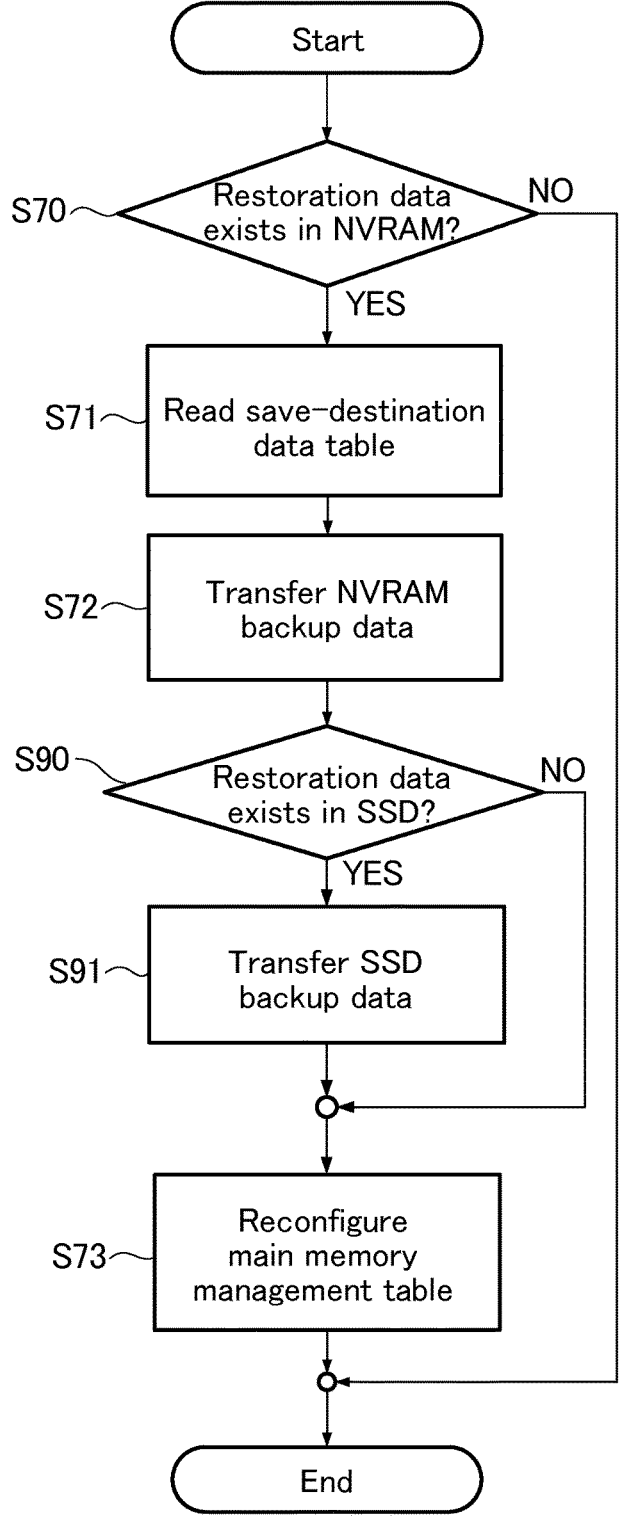
FIG. 18 shows a flowchart of a backup data restoration process according to the second embodiment.

FIG. 18 shows a flowchart of a backup data restoration process by the MP 13 when power has been restored in this embodiment. The same numbers will be assigned and explanations omitted for processing that is the same as the restoration process shown in FIG. 14; only the different processes will be explained.

In the restoration process of this embodiment, Step S90 and Step S91 have been added between Step S72 and Step S73. In Step S90, the MP 13 determines whether or not backup data is stored in the SSD 17. When backup data is not stored in the SSD 17, the MP 13 advances to Step S73. Alternatively, when backup data is stored in the SSD 17, the MP 13 transfers the backup data saved in the SSD 17 to the main memory 14.

Next, a storage apparatus in a third embodiment of the present invention will be explained. In this embodiment, the only thing that differs compared to the storage apparatus in the first embodiment is the backup data restoration process. Accordingly, only an explanation of the backup data restoration process will be given. In this restoration process, data that is to be transferred to the main memory 14 and data that is not to be transferred to the main memory 14 are respectively selected from among the backup data on the NVRAM 15, and only the data that is to be transferred to the main memory 14 is transferred to the main memory 14. In accordance therewith, the time it takes for backup data restoration processing is reduced. Also, the same numbers will be assigned and explanations omitted for configurations that are the same as the first embodiment; only the different parts of the configuration will be explained.

Figure 19:
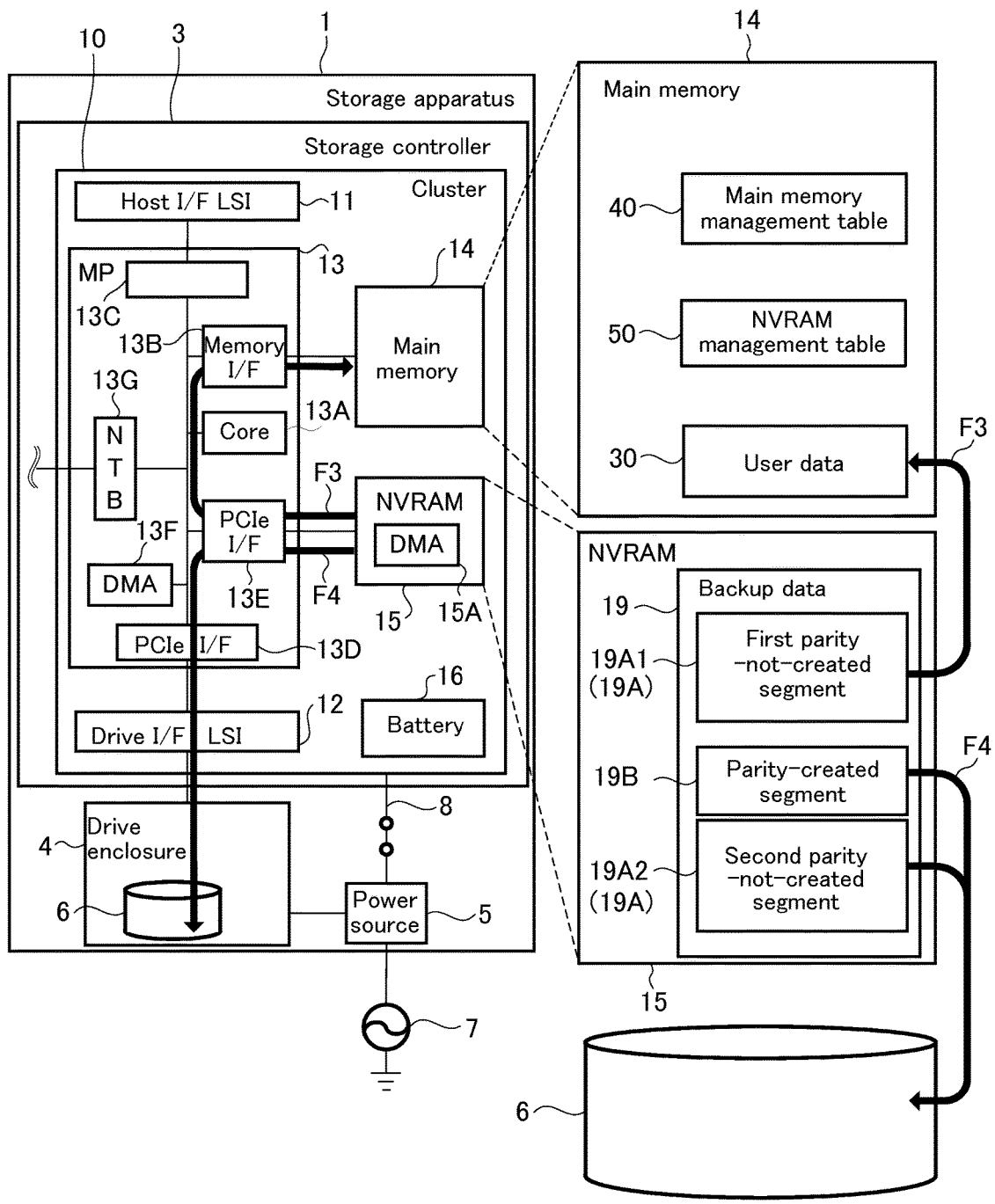
FIG. 19 shows a backup data restoration processing operation according to a third embodiment.

FIG. 19 shows a backup data restoration processing operation by the MP 13 when power has been restored in this embodiment.

As shown in FIG. 19, in this embodiment, a determination is made as to whether to return the backup data 19 saved to the NVRAM 15 segment-by-segment to the main memory 14, or to destage the backup data 19 to the storage drive 6. For example, the segments are classified into parity-not-created segments 19A for which parity has not been created, and parity-created segments 19B for which parity has been created. The parity-not-created segments 19A are further classified into first parity-not-created segments 19A1 for which the percentage of dirty data in the parity-not-created segment 19A is less than a prescribed threshold, and second parity-not-created segments 19A2 for which the percentage thereof is equal to or larger than the prescribed threshold.

Then, in the backup data restoration process, there is executed a data transfer F3 for transferring the dirty data in a first parity-not-created segment 19A1 to the main memory 14, and a data transfer F4 for transferring the dirty data in a parity-created segment 19B and a second parity-not-created segment 19A2 to the storage drive 6. This makes it possible to strive to reduce the amount of transfer data transferred to the main memory 14, and to end restoration processing in a short period of time.

Figure 20:
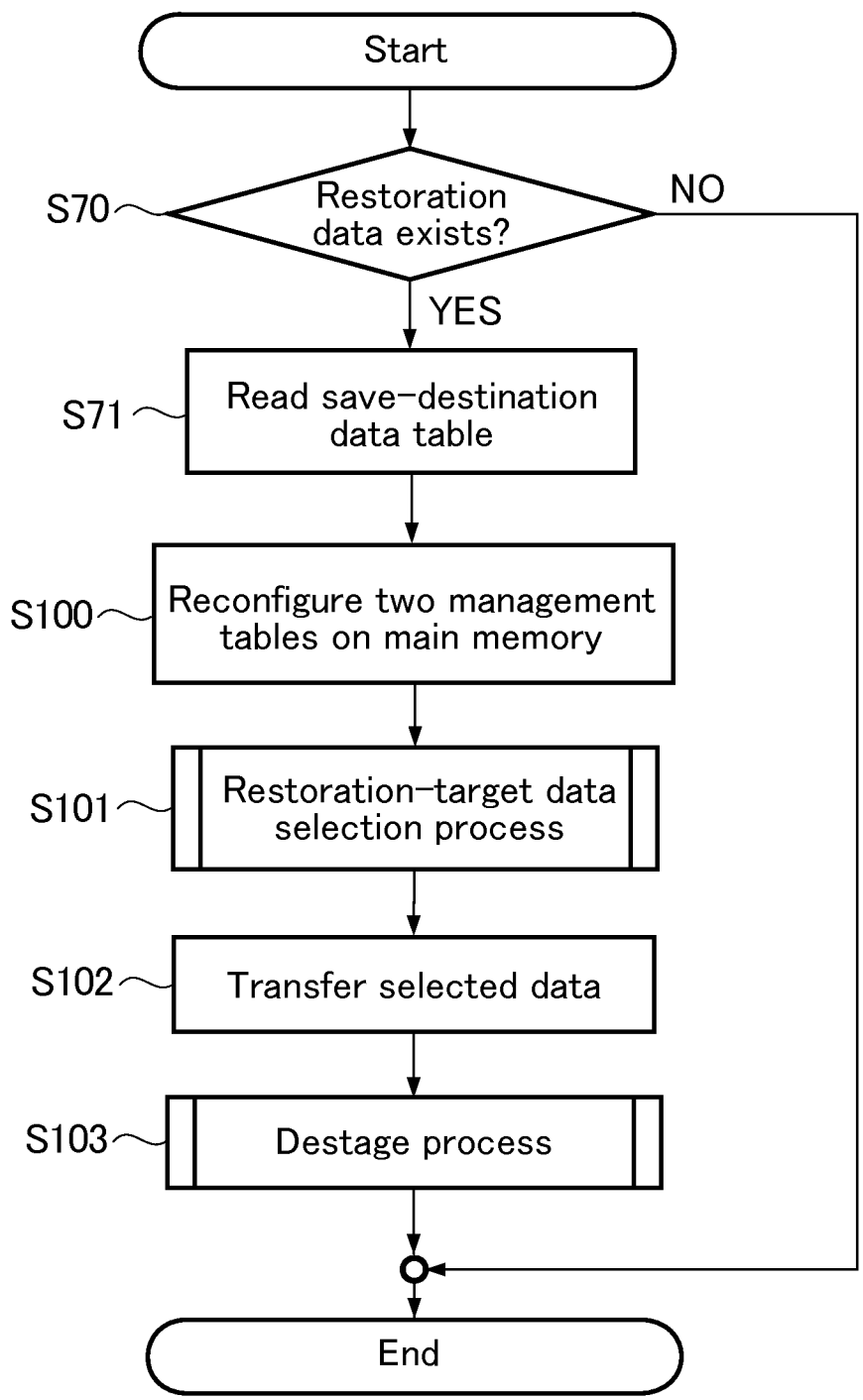
FIG. 20 shows a flowchart of a backup data restoration process according to the third embodiment.

FIG. 20 shows a flowchart of the backup data restoration processing by the MP 13 when the power has been restored in this embodiment. The same numbers will be assigned and explanations omitted for processing that is the same as the restoration process shown in FIG. 14; only the different processes will be explained.

After executing the processing of S70 and S71, the MP 13 reads the main memory management table 40 and the NVRAM management table 50 from the NVRAM 15, and writs the tables on the main memory 14 (S100). After configuring the tables, the MP 13 executes a restoration-target data selection process (S101). The restoration-target data selection process will be explained in detail below. When the restoration-target data selection process has ended, the MP 13 transfers the backup data (dirty data) selected in the restoration-target data selection process as data to be restored to the main memory 14 (S102). At backup data transfer time, the MP 13 checks the CRC code appended to the backup data, and when a CRC error is detected, discards the data. Thereafter, the MP 13 executes a destage process (S103), and ends the backup data restoration process. The destage process will be explained in detail below.

Figure 21:
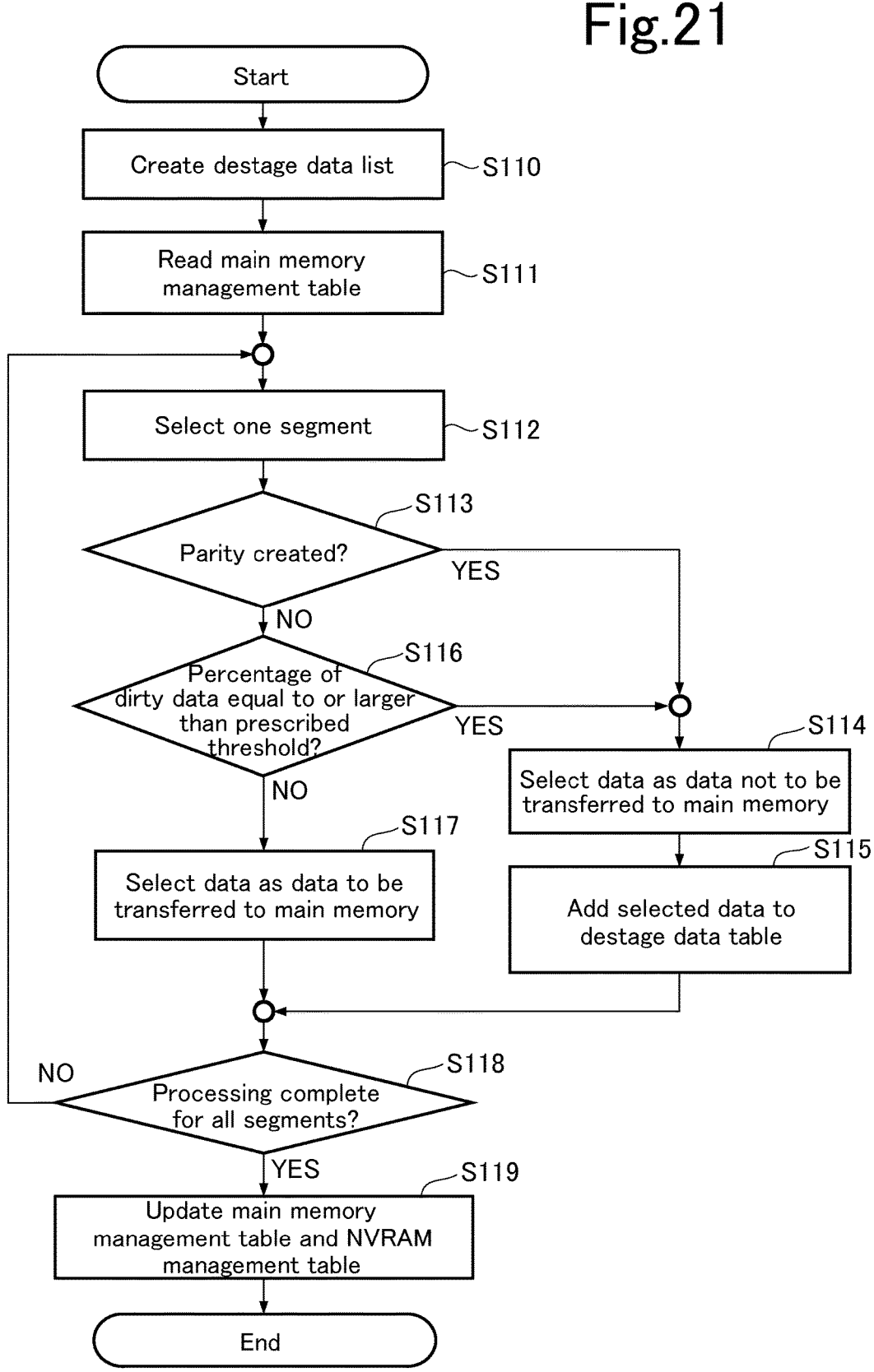
FIG. 21 shows a flowchart of a restoration-target data selection process.

FIG. 21 shows a flowchart of the restoration-target data selection process in this embodiment.

First, the MP 13 creates the destage data table 80 shown in FIG. 22 on the main memory 13 (S110). In FIG. 22, data has been inputted to the destage data table 80, but the destage data table 80 is empty at the creation time point.

Next, the MP 13 reads the main memory management table 40 (S111). This process makes it possible to confirm the state of cache management in the main memory 14 prior to the power stoppage. The MP 13 selects one segment that includes dirty data from the segment management table 43 (S112). The MP 13 determines whether or not parity has been created for the selected segment (S113). Whether or not parity has been created is determined by referring to the slot status 42D in the slot management table 42. When the selected segment is parity-created (S113: YES), the MP 13 selects the dirty data in the selected segment as the data that is not to be transferred to the main memory 14 (S114). That is, from among the backup data stored in the NVRAM 15, the MP 13 selects dirty data corresponding to the dirty data in the selected segment as data that is not to be transferred to the main memory 14. Next, the MP 13 adds the dirty data selected in S114 to the destage data table of FIG. 22 (S115).

Alternatively, when the selected segment is parity-not-created (S113: NO), the MP 13 determines whether or not the percentage of dirty data relative to the data in the selected segment is equal to or larger than a prescribed threshold (S116). The percentage of dirty data relative to the data in the selected segment is calculated by referring to the segment management table 43 (FIG. 4). Also, the prescribed threshold can be freely set by the user. In the backup process, when only dirty data has been saved, the MP 13 determines whether or not the percentage of dirty data relative to the overall size, including the free area in the selected segment, is equal to or larger than the prescribed threshold. When the percentage of dirty data is equal to or larger than the prescribed threshold (S116: YES), the MP 13 advances to S114.

Alternatively, when the percentage of dirty data is less than the prescribed threshold (S116: NO), the MP 13 selects the dirty data in the selected segment as the data to be transferred to the main memory 14, and creates a data transfer instruction (S117). The amount of dirty data in a segment in which the percentage of dirty data is smaller than the prescribed threshold can be considered to be relatively small, enabling the amount of data transferred to the main memory 13 at data restoration time to be minimized. Accordingly, the restoration process can be ended in a short period of time. Furthermore, only dirty data was selected in S117, but clean data may also be selected and restored.

Next, the MP 13 determines whether or not processing has been completed for all the segments that includes dirty data, and when the processing has been completed, advances to S119 (S118: YES), and when the processing has not been completed, returns to S112 (S118: NO). The MP 13 updates the main memory management table 40 and the NVRAM management table 50 on the basis of the data selected in S114 and S117. That is, the MP 13 deletes information related to the dirty data destaged to the storage drive 6 from the main memory management table 40 and the NVRAM management table 50, enabling new dirty data to be stored. This makes it possible to enhance the efficiency of cache use in the main memory 14. Also, updating the main memory management table 40 and the NVRAM management table 50 makes it possible to establish the integrity between the management tables 40 and 50 and the status of the user data in the main memory 14 and the NVRAM 15 following the backup data restoration process.

FIG. 22 shows the configuration of the destage data table 80 for managing dirty data, which is the target of destage processing.

The destage data table 80 stores a slot management pointer 81, a slot ID 82, a segment ID 83, a dirty data size 84, and a dirty data head address 85. The slot ID 82, the segment ID 83, the dirty data size 84, and the dirty data head address 85 are information that is in the NVRAM 15.

Figure 23:
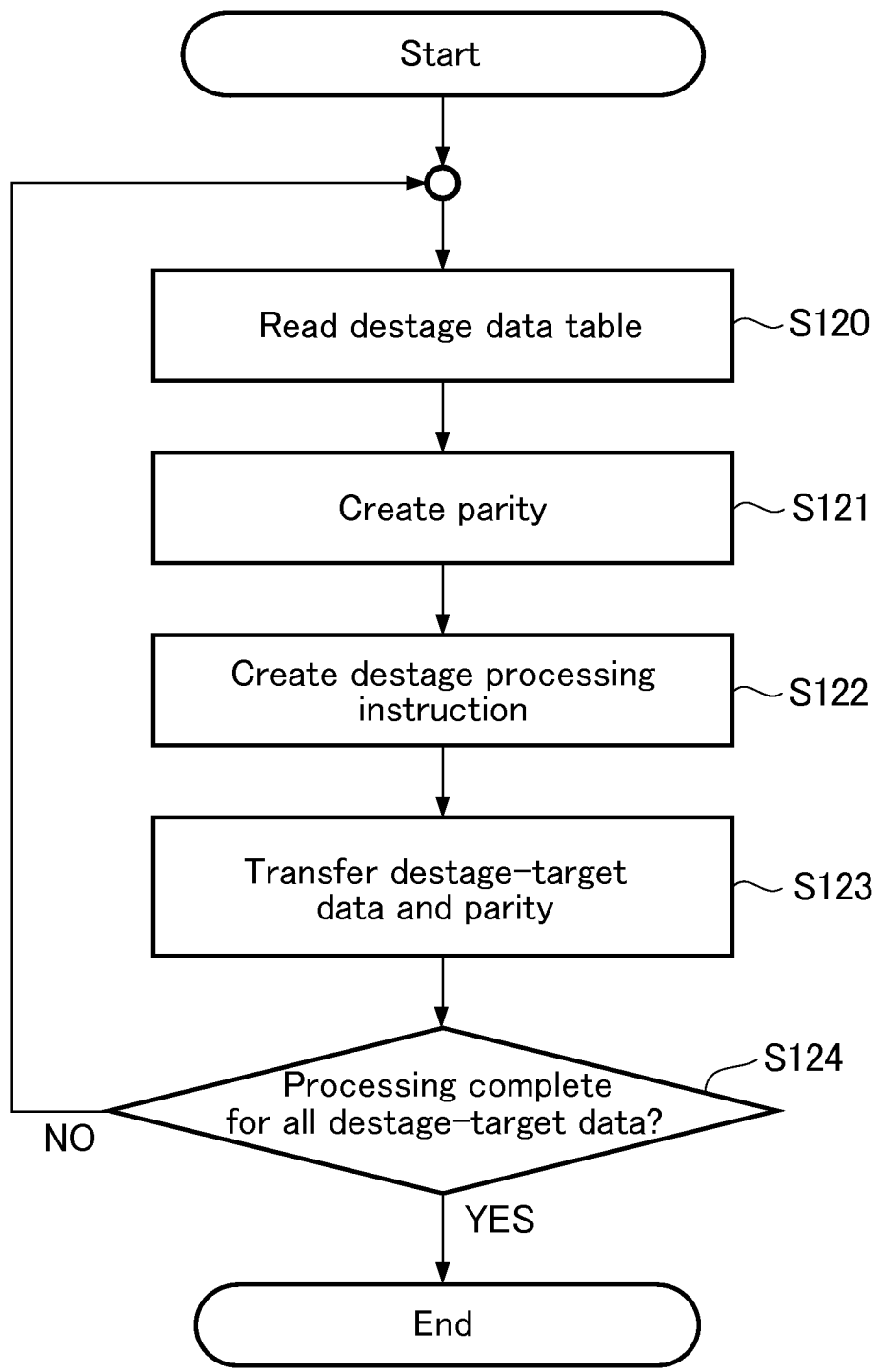
FIG. 23 shows a flowchart of a destage process.

FIG. 23 shows a flowchart of the destage process in this embodiment.

First, the MP 13 reads the destage data table 80 from the main memory 13 (S120). Next, the MP 13 creates parity for parity-not-created dirty data from among the dirty data targeted for destaging (S121), and creates a instruction for destaging the destage-target dirty data and the parity to the storage drive 6 (S122). The DMA 15A of the NVRAM 15 may create the parity.

The MP 13 reads the created instruction to the drive I/F LSI 12, and transfers the destage-target dirty data and the parity to the storage drive 6 (S123). After the transfer, the MP 13 determines whether or not the destage process has been completed for all of the destage-target data in the destage data table 80 (S124), returns to S120 when destaging for all the data has not been completed, and ends the destage process when destaging for all the data has been completed.

Next, a storage apparatus of a fourth embodiment of the present invention will be explained. In this embodiment, when selecting a save destination on the NVRAM 15, an infrequently used clean slot is selected on a priority basis, and backup data is saved to the selected clean slot. This makes it possible to leave behind a frequently used clean slot and to enhance cache hit rate of the apparatus after the post-power restoration. The same numbers will be assigned and explanations omitted for configurations that are the same as the first embodiment; only the different parts of the configuration will be explained.

Figure 24:
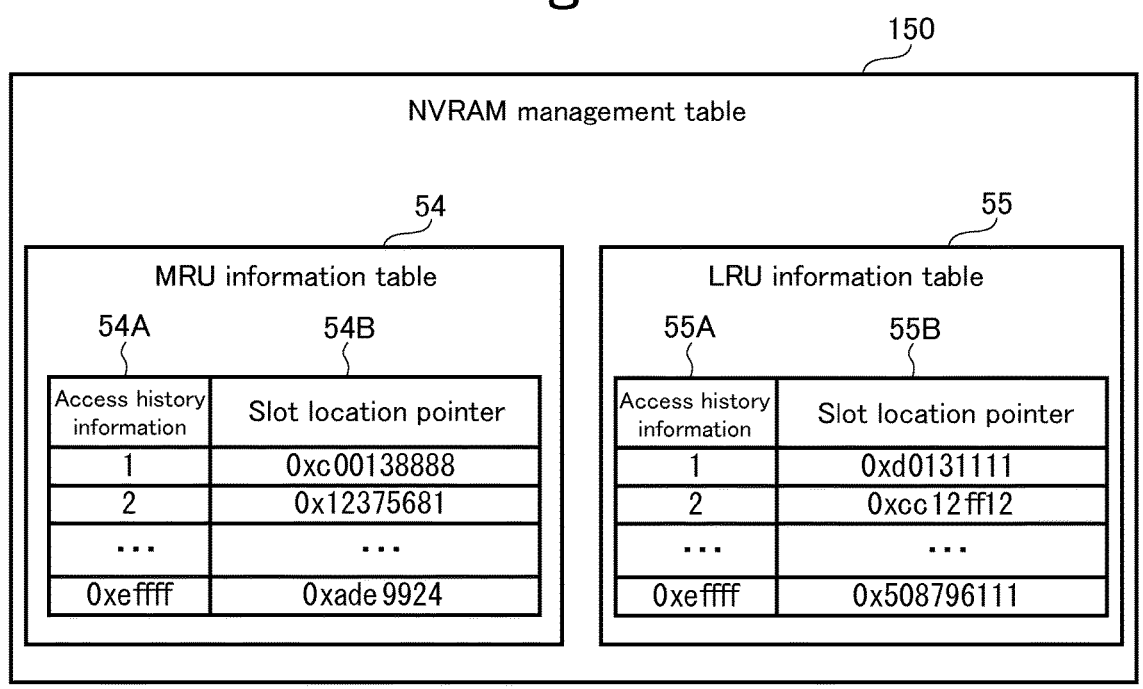
FIG. 24 shows the configuration of an NVRAM management table according to the third embodiment.

FIG. 24 shows the configuration of a NVRAM management table 150 in this embodiment. The NVRAM management table 150 stores an MRU information table 54 and an LRU information table 55. Although not shown in the drawing, the NVRAM management table 150 also stores the slot management pointer table 51, the slot management table 52, and the segment management table 53 shown in FIG. 6.

The MRU information table 54 indicates which slot has been accessed most recently. That is, in the MRU information table 54, the configuration is such that the most recently accessed slot is arranged higher. In other words, a slot that has not been accessed most recently is arranged lower. The MRU information table 54 includes access history information 54A and a slot location pointer 54B. The access history information 54A indicates the slot that has been accessed most recently, a smaller number indicating a more recent access. The slot location pointer 54B indicates the location of a slot that has been accessed. Therefore, when a certain slot has been accessed, the MP 13 arranges the slot the highest in the MRU information table 54.

The LRU information table 55 indicates which slot has not been accessed most recently. That is, in the LRU information table 55, the configuration is such that the slot that has not been accessed most recently is arranged higher. In other words, a slot that has been accessed most recently is arranged lower. The LRU information table 55 includes access history information 55A and a slot location pointer 55B. The access history information 55A indicates the slot that has not been accessed most recently, a smaller number indicating a less recent access. The slot location pointer 55B indicates the location of a slot that has not been accessed. All the slots in the NVRAM 15 are stored in either the MRU information table 54 or the LRU information table 55.

The MRU information table 54 is configured so that the most recently accessed slot is arranged higher, but may be configured so that the number of accesses to a slot within a prescribed period of time is recorded and the slot that has been accessed the most number of times is arranged higher. Similarly, the LRU information table 55 is configured so that the slot that has not been accessed most recently is arranged higher, but may be configured so that the number of accesses to a slot within a prescribed period of time is recorded and the slot that has been accessed the least number of times is arranged higher.

Figure 25:
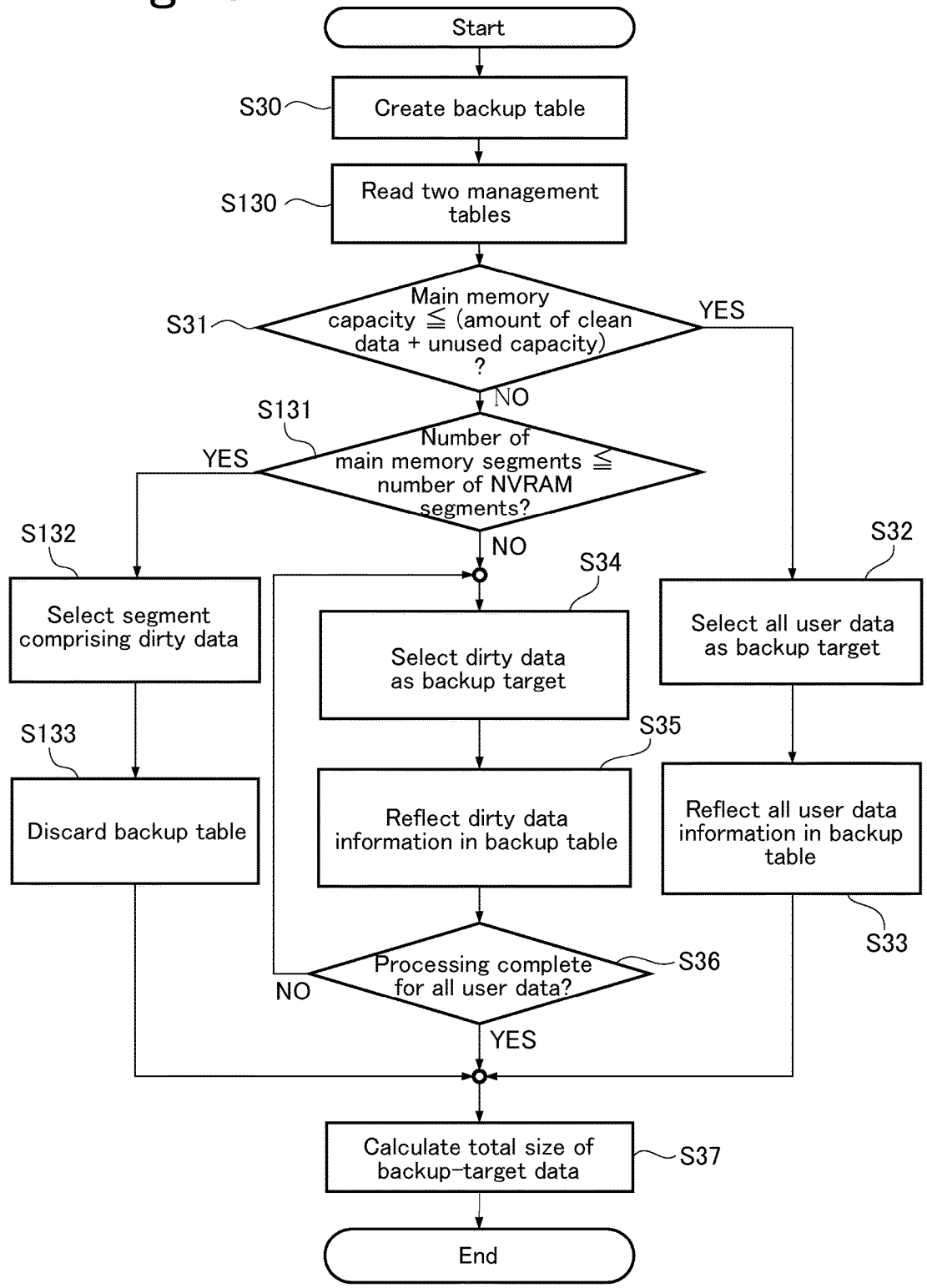
FIG. 25 shows a flowchart of a backup data selection process according to the third embodiment.

FIG. 25 shows a flowchart of a backup data selection process for selecting backup data of the main memory 14 in this embodiment. The same numbers will be assigned and explanations omitted for processing that is the same as the backup data selection process shown in FIG. 11; only the different processes will be explained.

After creating a backup data table 60, the MP 13 reads the main memory management table 40 and the NVRAM management table 150 (S130). This makes it possible for the MP 13 to ascertain the amount of clean data and the amount of dirty data in the storage apparatus 1.

When it has been determined that the main memory capacity is larger than the total amount of data (S31: NO), the MP 13 determines whether or not the number of segments including dirty data in the main memory 14 is equal to or less than the number of segments in the clean state in the NVRAM 15 (S131). When the number of segments including dirty data in the main memory 14 is equal to or less than the number of segments in the clean state in the NVRAM 15 (S131: YES), the MP 13 selects the segments including the dirty data as the backup data (S132). This makes it possible for the MP 13 to select and extract only the dirty data from among the segments, and to save all the dirty data using only a process for copying the segments without having to perform a transfer to the NVRAM 15. The MP 13 is able to backup the dirty data by performing a process for releasing the clean-state segments in the NVRAM 15 and copying segments of the main memory 14 that includes dirty data. The MP 13 discards the backup data table 60 created in S30 (S133). That is, the MP 13 backs up the data in segment units, thereby doing away with the need for information such as the head address of the backup data, and therefore discards the backup data table 60.

Figure 26:
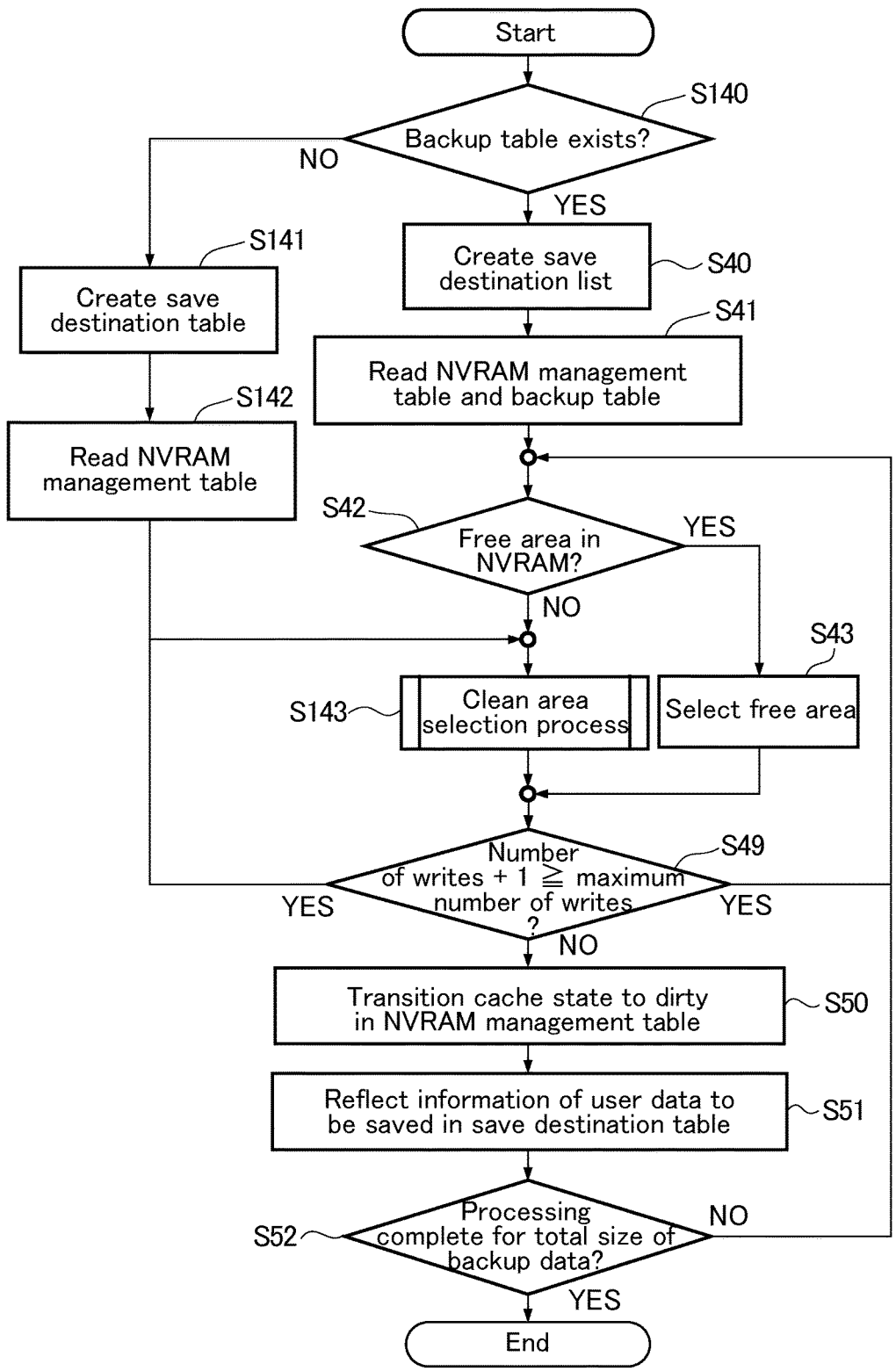
FIG. 26 shows a flowchart of a save destination selection process according to the third embodiment.

FIG. 26 shows a flowchart of a save destination selection process for selecting a backup data save destination from the NVRAM 15 in this embodiment. The same numbers will be assigned and explanations omitted for processing that is the same as the save destination selection process shown in FIG. 12; only the different processes will be explained.

First, the MP 13 determines whether or not a backup data table 60 exists on the main memory 14 (S140). When a backup data table 60 does not exist (S140: NO), that is, when the backup data table 60 was discarded in S133 of FIG. 26, the MP 13 creates a save destination list (S141). Thereafter, the MP 13 reads the NVRAM management table 150 (S142), and performs the process for selecting the save destination (S143). The clean area selection process of S143 will be explained in detail below.

Alternatively, when the backup data table 60 exists (S140: YES), the MP 13 executes the processing of S40 through S42 that was explained using FIG. 12, and performs the processes for selecting the save destination (S43, S141).

The MP 13, in a case where the number of times obtained by adding 1 to the number of writes for the selected area is equal to or larger than the maximum number of writes possible (S49: YES), returns to the processing of S42 when the route up to the processing of S49 is the route for executing the processing of S40 through S42, and returns to the processing of S143 when the route is for executing the processing of S140 and S141.

Also, in the processing of S51, the MP 13 reflects information related to the allocated user data in the save-destination data table 70 when the route up to the processing of S51 is the route for executing the processing of S40 through S42, and reflects information related to the slot and segment selected in S143 in the save destination list when the route is for executing the processing of S140 and S141.

Figure 27:
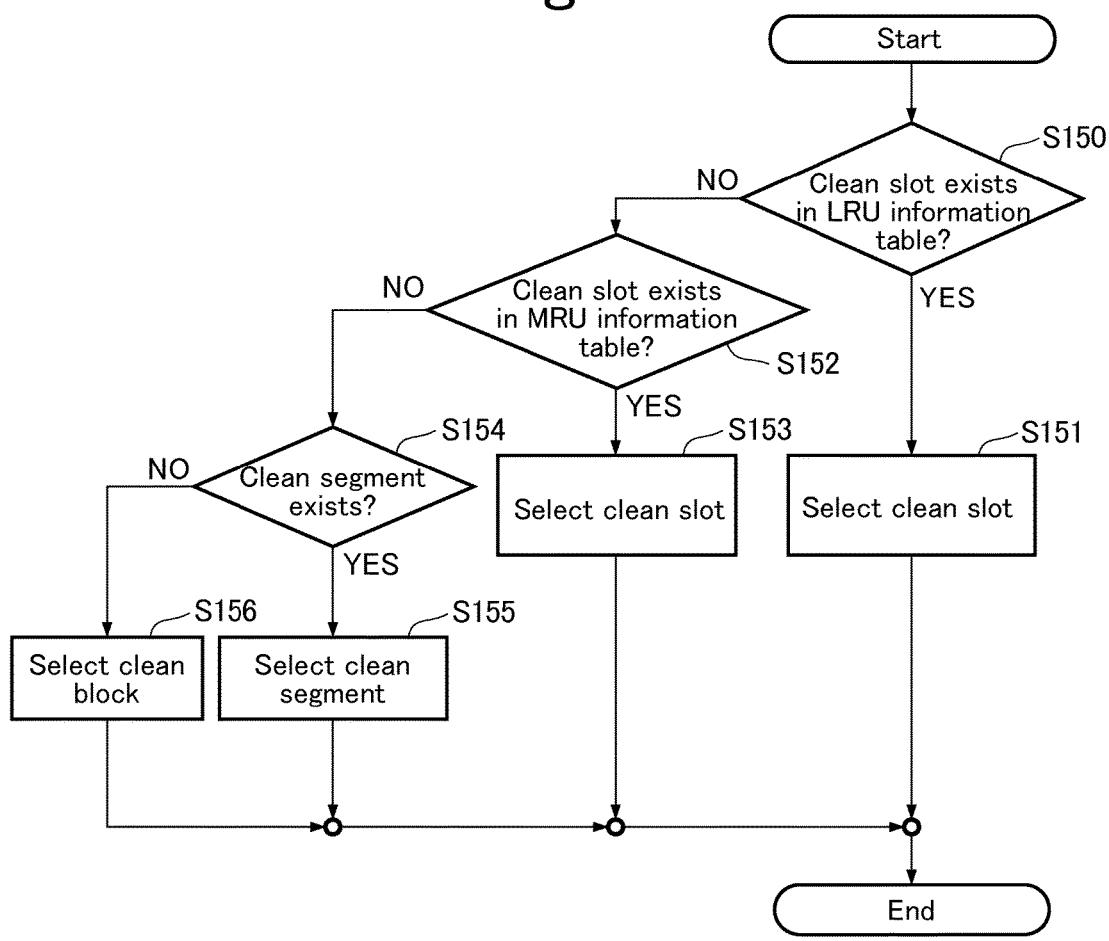
FIG. 27 shows a flowchart of a clean area selection process.

FIG. 27 shows a flowchart for a clean area selection process.

First, the MP 13 determines whether or not there is an unselected clean slot to serve as a save destination in the LRU information table 55 of the NVRAM management table 150 read via either the processing of S41 or the processing of S141 (S150). When an unselected clean slot exists in the LRU information table 55 (S150: YES), the MP 13 selects the highest clean slot (S151) and ends the clean area selection process.

Alternatively, when an unselected clean slot does not exist in the LRU information table 55 (S150: NO), the MP 13 determines whether or not there is an unselected clean slot to serve as a save destination in the MRU information table 54 (S152). When an unselected clean slot exists in the MRU information table 54 (S150: YES), the MP 13 selects the lowest clean slot (S151) and ends the clean area selection process. Selecting a clean slot in this way makes it possible to leave behind the frequently used clean slots, thereby enabling the cache hit rate to be improved after power is restored.

When an unselected clean slot does not exist in the MRU information table 54 (S152: NO), the MP 13 advances to the processing of S154. The processing of S154 through S156 is the same as that of S46 through S48 in FIG. 12, and as such, explanations will be omitted.

Figure 28:
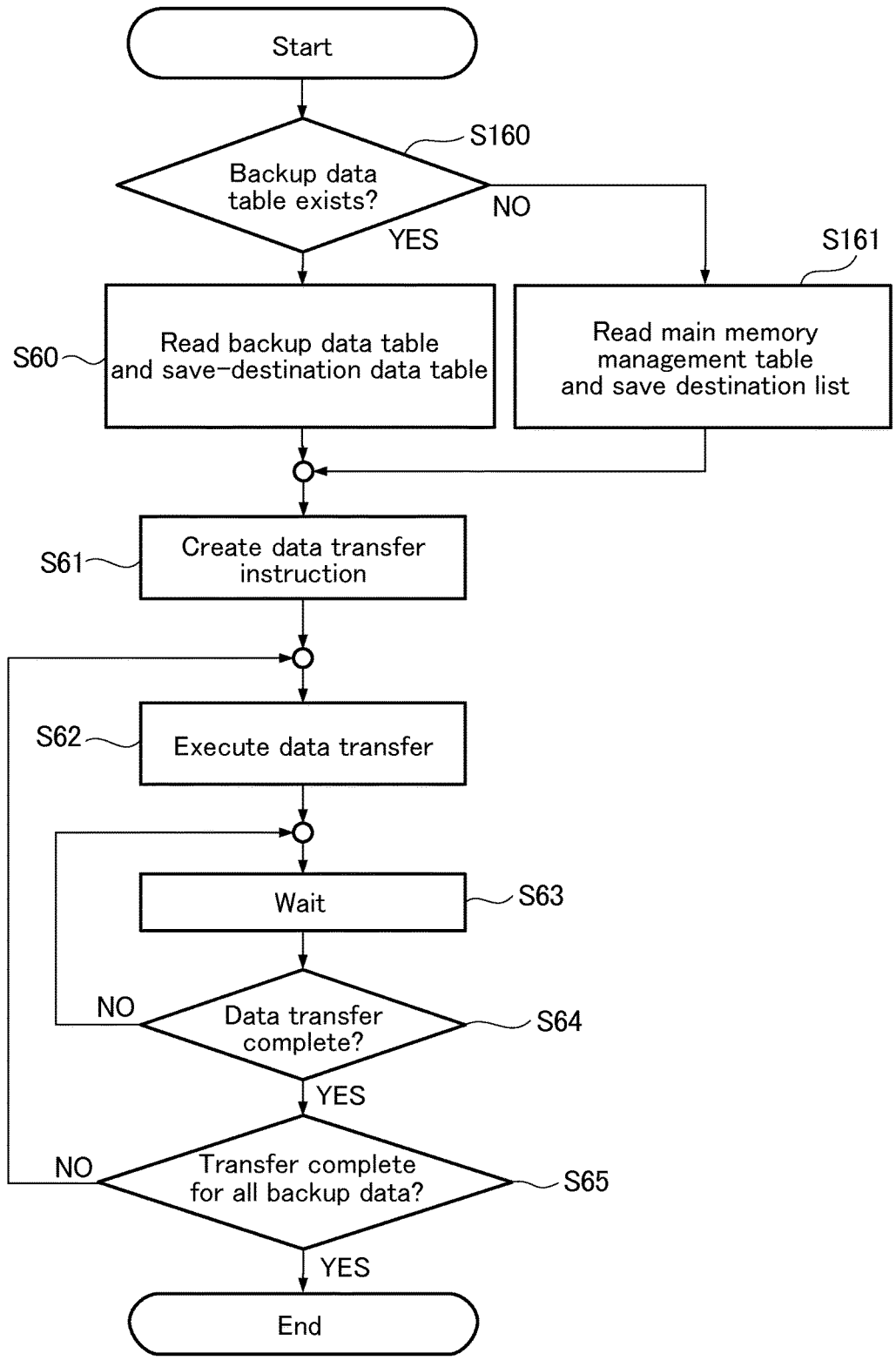
FIG. 28 shows a flowchart of a data transfer process according to the third embodiment.

FIG. 28 shows a flowchart of a data transfer process for transferring backup data from the main memory 14 to the NVRAM 15 in this embodiment. The same numbers will be assigned and explanations omitted for processing that is the same as the save destination selection process shown in FIG. 13; only the different processes will be explained.

First, the MP 13 determines whether or not a backup data table 60 exists in the main memory 14 (S160). When a backup data table 60 does not exist in the main memory 14 (S160: NO), that is, when the backup data table 60 was discarded in the processing of S133 of FIG. 25, the MP 13 reads the main memory management table 40 and the save destination list. Then, in the processing of S61, the MP 13 creates an instruction for copying a segment including dirty data in the main memory management table 40 to a segment in the save destination list. The main memory management table 40, the NVRAM management table 50, and the save destination list are included in the transfer target.

Alternatively, when a backup data table 60 exists in the main memory 14 (S160: YES), the MP 13 performs the processing of S60.

FIG. 29 shows a flowchart of a backup data restoration process related by the MP 13 when power has been restored to this embodiment. The same numbers will be assigned and explanations omitted for processing that is the same as the save destination selection process shown in FIG. 13; only the different processes will be explained.

The MP 13, in S70, determines whether or not a backup data table 60, a save-destination data table 70, or a save destination list are stored in the NVRAM 15. When it has been determined that restoration data exists in the NVRAM 15 (S70: YES), the MP 13 determines whether or not a save destination table exists in the NVRAM 15 (S170). When a save destination table exists in the NVRAM 15, the MP 13 executes the processing of S71 through S73. That is, when a save destination table exists in the NVRAM 15, all the user data or dirty data was saved.

Alternatively, when a save destination table does not exist in the NVRAM 15, the MP 13 transfers the main memory management table 40 and the NVRAM management table 50 to the main memory 14, and reconfigures the management tables 49 and 50 on the main memory 14 (S171). That is, the data saved to the NVRAM 15 in the data transfer process is not returned to the main memory 14 in the restoration process. This makes it possible to shorten the time it takes for the restoration process, and enables the host computer 2 to access the user data in the NVRAM 15 immediately after power has been restored.

The above embodiments have been explained in detail to illustrate the present invention in an easy-to-understand manner, and are not necessarily limited to embodiments including all the configurations that were explained. One part of the configuration of a certain embodiment can be replaced with the configuration of another embodiment. It is also possible to add the configuration of a certain embodiment to the configuration of another embodiment. Another configuration can be added, deleted, or substituted for one part of the configuration of each embodiment. For example, the configurations, functions, processing parts, and processing means and so forth described above may be realized using hardware by designing either all or a part thereof, for example, using an integrated circuit. Or, the above-described configuration, functions, and so forth may be realized using software in accordance with a processor interpreting and executing programs for realizing the respective functions.

REFERENCE SIGNS LIST

1 Storage apparatus
2 Host computer
6 Storage drive
4 Drive enclosure
3 Storage controller
14 Main memory
15 NVRAM
16 Battery
60 Backup data table
70 Save-destination data table

The invention claimed is:

1. A storage system comprising:
a storage device; and
a storage controller configured to receive data from a host computer and to store the received data in the storage device,
wherein the storage controller includes:
a processor,
a volatile first cache memory that is coupled to the processor and that temporarily stores the data,
a nonvolatile second cache memory that is coupled to the processor and that temporarily stores the data, and
a battery to supply electrical power to at least the processor, the first cache memory, and the second cache memory when a power stoppage has occurred,
wherein the second cache memory includes a dirty data area for storing dirty data, which is the data that is not stored in the storage device, and a remaining area other than the dirty data area,
wherein the remaining area of the second cache memory includes a clean data area for storing clean data, which is the data stored in the storage device, and a free area in which data is not stored,
wherein the processor, when the power stoppage has occurred, is configured to:
compare a first cache memory capacity with a total capacity of the clean data area and the free area in the second cache memory,
when the first cache memory capacity is equal to or less than the total capacity, set target data as all the data stored in the first cache memory,
when the first cache memory capacity is larger than the total capacity, set the target data as only the dirty data stored in the first cache memory, and
store the target data in the remaining area of the second cache memory.

2. The storage system according to claim 1, wherein
the processor, when the power stoppage has occurred, is further configured to:
create, on the first cache memory, a target data table indicating in which part of the first cache memory the target data is stored, and a save-destination data table indicating in which part of the second cache memory the target data is to be stored, and
store the target data table and the save-destination data table together with the target data in the remaining area of the second cache memory.

3. The storage system according to claim 1, wherein
the processor is further configured to preferentially cause the free area, from among the clean data area and the free area, to serve as a storage destination of the target data.

4. The storage system according to claim 3, wherein
the clean data area comprises a plurality of areas having different sizes, and
the processor is further configured to store the target data in the areas in order starting from one of the areas having a largest size.

5. The storage system according to claim 1, wherein
the storage controller further comprises a nonvolatile storage medium that is coupled to the processor, and
the processor, when the power stoppage has occurred, is further configured to store the target data by dividing the target data between the remaining area of the second cache memory and the nonvolatile medium.

6. The storage system according to claim 5, wherein the processor is further configured to:
calculate a first transfer throughput, which is a data transfer amount per unit of time from the first cache memory to the second cache memory, and a second transfer throughput, which is a data transfer amount per unit of time from the first cache memory to the nonvolatile medium, and
on the basis of the first transfer throughput and the second transfer throughput, determine a first data amount for storing in the remaining area of the second cache memory and a second data amount for storing in the nonvolatile medium.

7. The storage system according to claim 1, wherein
the target data is stored in a plurality of segments of the second cache memory, and
the processor, when the power stoppage has been resolved following the occurrence of the power stoppage, is configured to:
decide, for each of the segments, whether or not parity has been created for the dirty data stored therein, and
in accordance with a percentage of the dirty data relative to the target data stored in the segments for which the parity has not been created, either transfer to the first cache memory or store in the storage device, the target data stored in the segments for which the parity has not been created.

8. The storage system according to claim 7, wherein the processor is further configured to store the target data in the storage device from the segments which store the target data for which the parity has been created.

9. The storage system according to claim 7, wherein the processor is further configured to create parity for the target data being stored in the storage device.

10. The storage system according to claim 1, wherein
the clean data area of the second cache memory includes a plurality of storage areas for storing clean data already stored in the storage device, and
the processor, in accordance with a plurality of frequencies access to the data stored in each of the storage areas, is further configured to rank each of the storage areas and store the target data in order starting from one of the storage areas with a lowest one of the frequencies of access.

11. A storage system comprising:
a storage device; and
a storage controller configured to receive data from a host computer and to store the received data in the storage device,
wherein the storage controller includes:
a processor,
a volatile first cache memory that is coupled to the processor and that temporarily stores the data,
a nonvolatile second cache memory that is coupled to the processor and that temporarily stores the data, and
a battery to supply electrical power to at least the processor, the first cache memory, and the second cache memory when a power stoppage has occurred,
wherein the second cache memory includes a dirty data area for storing dirty data, which is the data that is not stored in the storage device, and a remaining area other than the dirty data area,
wherein the remaining area of the second cache memory includes a clean data area for storing clean data, which is the data stored in the storage device, and a free area in which data is not stored,
wherein the processor, when the power stoppage has occurred, is configured to:
compare the first cache memory capacity with a second cache memory capacity,
when the first cache memory capacity is smaller than the second cache memory capacity, set a difference between the first cache memory capacity and the second cache memory capacity as a maximum capacity for dirty data that can be held in the second cache memory,
when the first cache memory capacity is equal to or larger than the second cache memory capacity, compare a maximum capacity for dirty data that can be held in the first cache memory with the second cache memory capacity,
when the second cache memory capacity is smaller than the maximum capacity for dirty data that can be held in the first cache memory, make the maximum capacity for dirty data that can be held in the first cache memory equivalent to the second cache memory capacity, and set a maximum capacity for dirty data that can be held in the second cache memory to 0,
when the second cache memory capacity is equal to or larger than the maximum capacity for dirty data that can be held in the first cache memory, set a difference between the second cache memory capacity and the maximum capacity for dirty data that can be held in the first cache memory as the maximum capacity for dirty data that can be held in the second cache memory, and
store the dirty data stored in the first cache memory as target data in the remaining area of the second cache memory up to the maximum capacity for dirty data that can be held in the second cache memory.

12. A method of controlling a storage system,
the method comprising:
temporarily storing received data in either a volatile first cache memory or a nonvolatile second cache memory each time data is received from a host computer;
storing the data that is stored in either the first cache memory or the second cache memory in a storage device, the nonvolatile second cache memory including a dirty data area for storing dirty data, which is the data that is not stored in the storage device, and a remaining area other than the dirty data area, and the remaining area of the second cache memory including a clean data area for storing clean data, which is the data stored in the storage device, and a free area in which data is not stored; and
when a power stoppage has occurred:
supplying electrical power to the storage system from a battery,
comparing a first cache memory capacity with a total capacity of the clean data area and the free area in the second cache memory,
when the first cache memory capacity is equal to or less than the total capacity, setting target data as all the data stored in the first cache memory,
when the first cache memory capacity is larger than the total capacity, setting the target data as only the dirty data stored in the first cache memory, and storing the target data in the remaining area of the second cache memory.

* * * * *